United States Patent
Obhan

(12) 
(10) Patent No.: US 6,275,695 B1
(45) Date of Patent: Aug. 14, 2001

(54) SPECTRUM YIELD MANAGEMENT IN A WIRELESS COMMUNICATION SYSTEM

(75) Inventor: Prem A. Obhan, Plano, TX (US)

(73) Assignee: Nortel Networks Limited, Montreal (CA)

( * ) Notice: Subject to any disclaimer, the term of this patent is extended or adjusted under 35 U.S.C. 154(b) by 0 days.

(21) Appl. No.: 09/169,022

(22) Filed: Oct. 8, 1998

(51) Int. Cl.⁷ ........................... H04Q 7/20
(52) U.S. Cl. ............... 455/423; 455/446; 455/422
(58) Field of Search ............... 455/453, 403, 455/512, 405, 408, 422, 466, 446; 379/243, 120

(56) References Cited

U.S. PATENT DOCUMENTS

| | | | |
|---|---|---|---|
| 5,276,907 | * 1/1994 | Meidan | 455/436 |
| 5,303,297 | * 4/1994 | Hillis | 455/406 |
| 5,327,573 | * 7/1994 | Lenchik et al. | 455/14 |
| 5,347,511 | * 9/1994 | Gun | 370/255 |
| 5,392,344 | * 2/1995 | Ash et al. | 379/221 |
| 5,490,087 | * 2/1996 | Redden et al. | 364/514 C |
| 5,546,455 | 8/1996 | Dennison | |
| 5,570,411 | * 10/1996 | Sicher | 455/450 |
| 5,592,154 | * 1/1997 | Lin et al. | 340/825.5 |
| 5,638,412 | 6/1997 | Blakeney | |
| 5,659,601 | 8/1997 | Chesloq | |
| 5,729,542 | * 3/1998 | Dupont | 370/346 |
| 5,790,534 | 8/1998 | Kokko | |
| 5,790,954 | 8/1998 | Tavloe | |
| 5,790,955 | 8/1998 | Tomoike | |
| 5,793,852 | * 8/1998 | Kang et al. | 379/115 |
| 5,794,140 | * 8/1998 | Sawyer | 455/408 |
| 5,794,156 | * 8/1998 | Alanara | 455/517 |
| 5,796,722 | * 8/1998 | Kotzin et al. | 370/252 |
| 5,864,617 | * 1/1999 | Donnelly | 379/266 |
| 5,903,843 | * 5/1999 | Suzuki et al. | 455/452 |
| 5,920,822 | * 7/1999 | Houde et al. | 455/466 |
| 5,937,353 | * 8/1999 | Fapojuwo | 455/444 |
| 5,991,378 | * 11/1999 | Apel | 379/114 |
| 6,009,331 | * 12/1999 | Ueda | 455/450 |
| 6,112,101 | * 8/2000 | Bhatia et al. | 455/512 |

\* cited by examiner

*Primary Examiner*—Dwayne Bost
*Assistant Examiner*—Sonny Trinh
(74) *Attorney, Agent, or Firm*—Bruce Garlick; James Harrison

(57) ABSTRACT

A spectrum yield management (SYM) system manages available spectrum within a wireless communication system. The SYM system includes at least one computer and connections within the wireless communication system to other components of the wireless communication system. The SYM system collects real-time and potential loading information for the wireless communication system and receives system operator parameters. The SYM system may support a plurality of classes with each class having subscriber members that receives services commensurate with the class. The SYM system may also support a plurality of corridors within the wireless communication system, with each corridor including at least once cell/sector. The SYM system provides signals to the components of the wireless communication and to subscriber units to influence their operation in a manner that will realize system operator goals with respect to spectrum usage. Examples of such signals include service option signals which provide either an incentive for a subscriber to increase its use or a disincentive for the subscriber to reduce its use. The SYM system may also operate to provide reserved spectrum within the wireless communication system and to perform other functions in managing available spectrum.

68 Claims, 17 Drawing Sheets

| ACCESS CLASS/ACCESS PRIORITY (REGULAR) | | |
|---|---|---|
| 1. | PREMIUM VOICE | 702 |
| 2. | REGULAR VOICE | 704 |
| 3. | HIGH PRIORITY SMS | 706 |
| 4. | DISCOUNT VOICE | 708 |
| 5. | BUSINESS DATA | 710 |
| 6. | DEEP-DISCOUNT VOICE | 712 |
| 7. | REGULAR DATA/TELEMETRY | 714 |
| 8. | LOW-PRIORITY SMS | 716 |

| ACCESS CLASS/ACCESS PRIORITY (GPRS) | | |
|---|---|---|
| 1. | PREMIUM VOICE | 752 |
| 2. | REGULAR VOICE | 754 |
| 3. | HIGH PRIORITY SMS | 756 |

| CELL NO. | ACCESS CLASS | FREE B/W | GOOD TILL | |
|---|---|---|---|---|
| 1 | 10 | 108K | 12:22:24 | 902 |
| 2 | 8 | 112K | 12:22:00 | 904 |
| 3 | 5 | 64K | 12:22:00 | 906 |
| 4 | 3 | 0K | 18:00:00 | 908 |
| 5 | 7 | 96K | 12:18:00 | 910 |
| 6 | 9 | 56K | 12:22:24 | 912 |
| 7 | 1 | 24K | 12:22:00 | 914 |
| 8 | 10 | 12K | 18:00:00 | 916 |

FIG. 9A

| CORRID. NO. | MINIMUM ACC. CLASS | GOOD TILL | |
|---|---|---|---|
| 1 | 9 | 12:22:24 | 952 |
| 2 | 7 | 12:22:00 | 954 |
| 3 | 5 | 12:22:00 | 956 |

FIG. 9B

SPECTRUM YIELD MANAGEMENT IN A WIRELESS COMMUNICATION SYSTEM

CROSS-REFERENCE TO RELATED APPLICATION

The present application was filed on even date with related U.S. application Ser. No. 09/168,946, filed Oct. 8, 1998, co-pending, claims priority to such application, and is hereby incorporated herein by reference in its entirety.

BACKGROUND

1. Technical Field

The present invention relates generally to wireless communication systems and more particularly to a system and method of operation for effectively managing spectrum in a wireless communication system to maximize usage of the wireless spectrum and to meet system operator goals for servicing subscribers.

2. Related Art

Cellular wireless communication systems are generally known in the art to facilitate wireless communications within respective service coverage areas. Such wireless communication systems include a "network infrastructure" that service the wireless communications with subscriber units operating in the service coverage areas. The network infrastructure typically includes a plurality of base stations dispersed throughout the service coverage area, each of which includes a base station transceiving subsystem (BTS), a tower and at least one antenna. The base stations couple to base station controllers (BSCs), with each BSC serving a plurality of base stations. Each BSC couples to a mobile switching center (MSC) which couples to the PSTN, the Internet and/or to other MSCs. Subscribing wireless units operating within the service coverage area communicate with one or more of the base stations. The communications are routed from the base stations to the MSC via a respective BSC. The MSC then routes the call to another subscribing wireless unit via a BSC/base station route or via the PSTN/Internet/other network route to another destination.

The cost of installing the network infrastructure is substantial. Thus, once the network is installed, the system operator attempts to load the network by increasing the number of subscribers having access to the network infrastructure and to increase the usage by each subscriber via aggressive pricing strategies. But, the system operator has no direct control in regulating the usage across the system and must attempt to elicit loading goals via the pricing strategies. In determining the effectiveness of the pricing strategies, the system operator monitors system usage, typically by collecting Operational Measurement (OM) data. The OM data is collected on a periodic basis and analyzed thereafter. Based upon the determined actual system usage, the system operator may adjust pricing strategies and goals to better load the system.

In loading the system, the system operator typically seeks to maintain a minimum safety margin between a peak-loading level and a total-capacity in each portion of the service coverage area. Based upon historical loading, current operating goals and projected loading levels, the system operator may determine that additional infrastructure is required and install the additional infrastructure. Such a determination is typically only made periodically or when actual operating problems exist. Network infrastructure expansions can take several months to implement since they involve RF-planning, ordering equipment from vendors, acquiring cell-sites etc. Thus, network problems typically last for several months after they are detected. During this period, significant subscriber dissatisfaction may result.

Thus, in loading its network infrastructure, the system operator generally obtains uncontrolled growth within some areas and ineffective spectrum utilization in other areas. Cellular providers throughout the world have made significant investments in spectrum licenses and infrastructure. Current yield management techniques are limited to time-of-day and day-of-the-week pricing schedules. Because spectrum is a perishable commodity, if it goes unsold and unused, revenue that could have otherwise been made, is lost. Conversely, having portions of the spectrum overused results in blocked calls and causes dissatisfaction of subscribers.

Wireless communication systems service primarily voice communications. System resources are required when people initiate voice communications. Thus, the system operator has little control over when the voice users access the system and can do nothing (absent blocking access) to alter the access times/durations of these voice users. However, as technology progresses, systems will be shared by voice users, data users and video users, each of these users having their own service characteristics. Hence, the spectrum must be properly managed to service the differing user demands and requirements in an economically efficient manner. Thus, there is a need in the art for a system and associated method of operation for intelligently managing spectrum within a wireless communication so that system operator revenue may be increased, subscriber loyalty may be maintained and differing service types may be managed together so that the needs of each service type are met.

SUMMARY OF THE INVENTION

Thus, in order to overcome the above described shortcomings, among others, a Spectrum Yield Management (SYM) system and method of operation tracks spectrum usage in real-time. Spectrum usage is measured in both real-time usage (of active subscribers) and in potential usage (of inactive subscribers that have registered with the system). Based upon the actual subscriber loading levels, potential subscriber loading levels, historical loading levels and the system capacity, the SYM system performs operations that manage use of the available spectrum according to the operating goals of the system operator.

One particular operating goal of a system operator is to increase revenue generated by the system. To increase revenue generation from an installed wireless infrastructure, the SYM system manages the system operator's subscriber priorities and spectrum resource allocation priorities by dividing the coverage area into corridors and managing the unique demand and supply characteristics over each corridor. Depending on subscriber preferences, network usage patterns, competitive pressures and the regulatory environment, a system operator can deploy the SYM system in a variety of ways so that service incentives and service disincentives are provided so as to reach desired loading patterns. Further, using the same and similar techniques, a system operator may use the SYM system to shift load from one time period to another time period.

According to the SYM system, a service coverage area is divided into "corridors" that make sense from a system operator's standpoint. Based upon system operating goals for each corridor, operating rules are generated for each corridor. These operating rules relate to the manner in which the available spectrum in each corridor will be managed.

The spectrum for each corridor is monitored in a real-time basis as is the unused spectrum. Active and idle subscribers are also tracked in each corridor. Based upon the demands placed on the resources of the corridor, subscribers needs are matched to available resources in the corridor and, when required, operations are taken to alter loading within the corridor according to the operating rules. By identifying unused capacity and filling such capacity, the SYM system enables the system operator to raise extra revenues via the SYM system managed voice/data/advertising services.

The SYM system, in another embodiment, divides the subscribers into a plurality of classes, each of which is treated differently with respect to services provided. In such case, some classes may receive reduced rate offerings or zero rate offerings to increase system usage while increasing customer satisfaction. The SYM system may also reserve spectrum within corridors for premium subscribers. In performing such reservation, the SYM system may preclude access of the reserved spectrum except for members of a particular class. In another operation, the SYM system may queue calls and call requests until a channel becomes available.

In dividing the subscribers into classes, differing types of access may be provided over time. For example, voice users will have access to the system on an as-needed basis, subject to class restraints that may limit the access of certain classes of voice users during heavy loading periods. Machine users of the system, such as vending machines, oil heads, electronic billboards, copiers, data terminals, short message service recipient machines and other machines that do not require access at any particular time, may be managed to access the system during reduced loading periods. For example, an electronic billboard that is updated periodically may access the system during lightly loaded periods. Likewise, short message services may access the system when spectrum is available, subject to required message latency limitations. In this fashion, the available spectrum may be managed to satisfy the various requirements of the users of the system.

Moreover, other aspects of the present invention will become apparent with further reference to the drawings and specification which follow.

BRIEF DESCRIPTION OF THE DRAWINGS

A better understanding of the present invention can be obtained when the following detailed description of the preferred embodiment is considered in conjunction with the following drawings, in which:

FIGS. 7A and 7B are block diagrams illustrating classes of subscribers contemplated according to the present invention;

FIGS. 9A and 9B are diagrams illustrating examples of admission control blocks compiled and constructed according to the present invention;

DETAILED DESCRIPTION OF THE DRAWINGS

Figure 1:
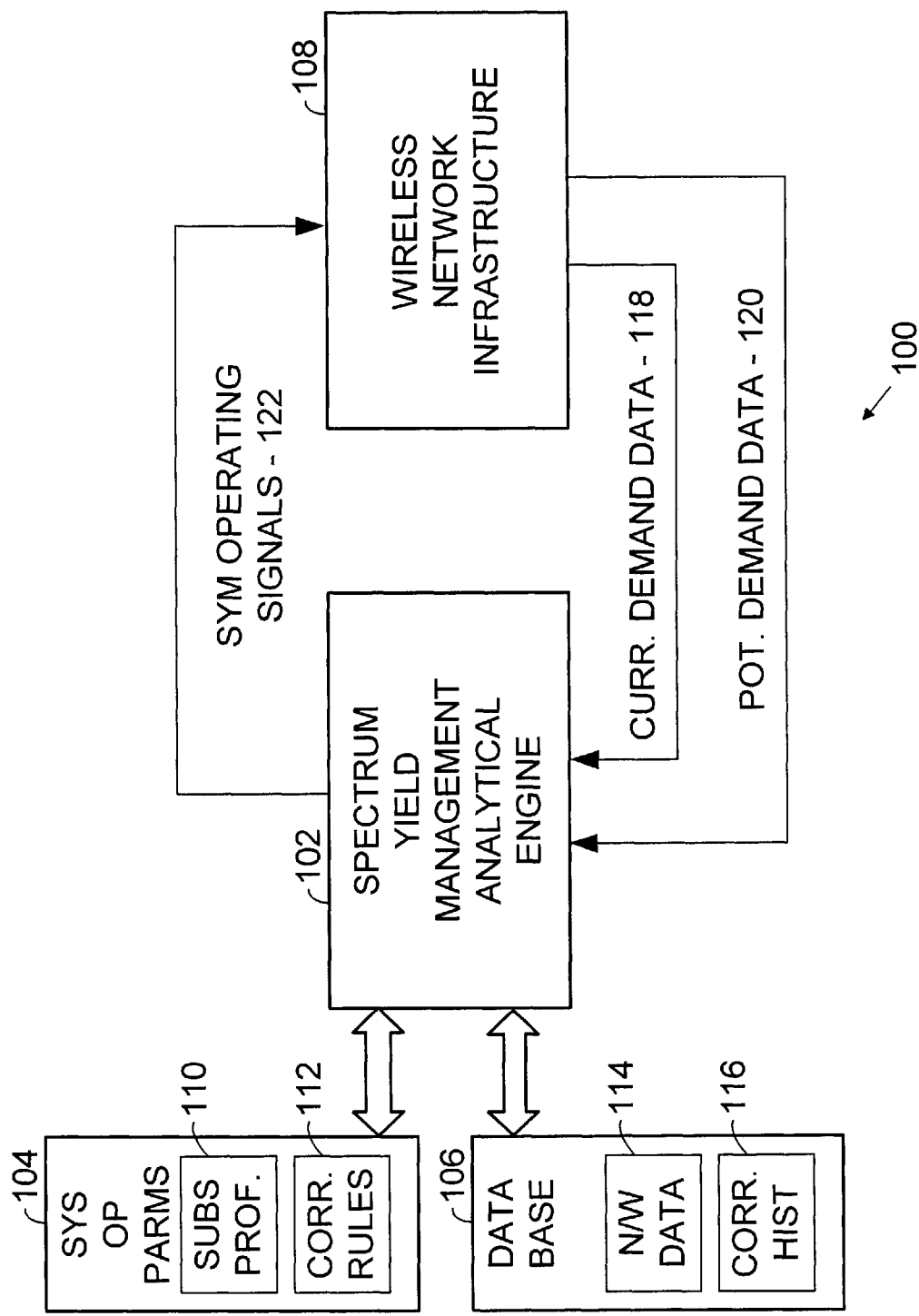
FIG. 1 is a block diagram illustrating a spectrum yield management system constructed according to the present invention that is coupled to a wireless communication system so that it may manage available spectrum within the system.

FIG. 1 is a block diagram illustrating a spectrum yield management system 100 constructed according to the present invention that is coupled to a wireless communication system. The spectrum yield management (SYM) system 100 includes a SYM analytical engine 102, system operator parameters 104 and a database 106, which together may be implemented by a separate computing device or a plurality of computing devices. These computing devices may be constructed as personal computers, server computers, mainframe computers or other forms of computing devices. In any case, the computing device(s) has sufficient computing capacity to perform the operations required by the present invention. The structure of computing devices is generally known in the art and will not be further described herein except as to expand upon the teachings of the present invention. The computing device may be tightly coupled with an MSC, BSC or other wireless network device or may be a part of the MSC, BSC or other wireless network device.

The SYM analytical engine 102 couples to the wireless network infrastructure 108 of a wireless communication system. In its operation, the SYM analytical engine 102 receives current demand data 118 and potential demand data 120 from the wireless network infrastructure 108 and delivers SYM operating signals 122 to the wireless network infrastructure 108. The current demand data 118 and potential demand data 120 indicate the current subscriber loading and the potential subscriber loading, respectively, within the wireless communication system.

The system operator parameters 104 include subscriber profiles 110 for a plurality of subscribers operating within the wireless communication system. The system operator parameters also include corridor rules for a plurality of corridors defined within the wireless communication system. The concept of corridors will be discussed in detail with reference to FIGS. 4 and 5. The system operator parameters 104 are typically provided by the system operator based upon the business goals it has for the wireless system.

The database 106 includes network data 114 and corridor history data 116. The network data 114 indicates the structure and operating limitations of the wireless communication system. The network data 114 typically includes topographical network engineering information that provides a layout of base stations of the wireless network infrastructure, the capacity provided by each cell/sector, constraints between neighboring cells/sectors and additional information relating to the structure of the wireless network infrastructure. The corridor history 116 includes the historical loading within each corridor of the wireless communication system, trends that have been developed from such loading and additional information regarding the corridors defined within the wireless communication system. The historical loading levels may include loading levels for time of day, day of week, peak loading, minimum loading and other loading levels of interest for the corridors.

The current demand data 118 includes various real-time and periodic data inputs from the wireless network including the spectrum usage at each base station supported by the wireless network infrastructure 108. Spectrum usage may be measured for a plurality of wireless resources. Wireless spectrum is allocated to each base station. The allocated spectrum is further divided into channels which may include broadcast channels, control channels and traffic channels, among others. Depending upon the standard, e.g., Code Division Multiple Access (CDMA), Time Division Multiple Access (TDMA) or Global Standard For Mobile Communications (GSM), under which the system operates, each channel is capacity limited and may handle only a maximum amount of traffic. Spectrum usage therefore may be determined for each of the allocated channels for the base station. Further, available capacity for each of the allocated channels may also be determined. Some of the types of services supported by the wireless communication system 100 constructed according to the present invention load some channels while not others. Thus, in determining loading levels and capacity levels, these factors must be considered and acted upon.

Potential demand data 120 is based upon the number of subscribers registered within the wireless communication system but presently not engaged in ongoing communications. The current demand data 118 and the potential demand data 120 may include information pertinent to particular subscribers of the wireless communication system. Such subscriber information may include the subscriber's location, the subscriber's class, the subscriber's current status and call detail records for the subscriber that show average call hold time and subscriber mobility during the call, among other characteristics.

In its implementation, the SYM analytical engine 102 is parameter driven. System operators define the parameters that control the computations of the analytical engine. The system operator input will be based upon the goals that the system operator has for the operation of the system. These goals, if met, will maximize revenue for the system operator.

According to the present invention, the system operator may divide the entire coverage area into corridors. The system operator then defines operating rules over each corridor which may enable classes of subscribers with respective service priorities. The SYM analytical engine 102 monitors spectrum usage, spectrum availability and demand for services time within the corridors and enforces respective operating rules over each corridor. These operating rules may limit access to certain classes of subscribers during particular operating periods so that other classes will have access. These operating rules may also limit access to certain types of services during particular operating periods as well.

Capacity in wireless communication systems is planned for peak loading periods in each cell. During an installation, traffic patterns over a coverage area are estimated and cells are engineered to service peak loads in each cell/sector. This approach in planning capacity leads to surplus during non-peak hours. However, during heavy loading periods, the system may be overloaded in certain areas and block calls.

According to one aspect of its operation, the SYM system 100 manages the surplus in each corridor to maximize usage. The SYM system 100 tracks spectrum supply and spectrum demand in each corridor. When the loading within a corridor falls below a loading threshold, the SYM system 100 sends a service option signal to subscribers in underutilized corridors within the wireless communication system that acts as a positive incentive for use. Some subscribers will initiate or continue their usage to fill idle capacity within the system. The service option signal may apprise a subscriber that he or she may make reduced rate calls, may continue an ongoing call at a reduced rate or may complete a call at no cost. Additionally, the service option signal may instruct various machines such as vending machines, billboards, etc. to transfer data during idle times.

However, when spectrum usage exceeds a desired level of usage and it is likely that some calls will be blocked, the SYM system 100 may provide a service option signal that is a disincentive for use. For example, when spectrum usage exceeds an upper loading threshold, the SYM system 100 provides an incentive signal to some subscribers that subsequent use will be billed at a premium. At least some of subscribers operating within these over-utilized corridors of the wireless network infrastructure 108 will be price sensitive and will reduce or discontinue usage, thus reducing system loading.

In providing the service option signals, the SYM system 100 is directed toward usage during a next time segment. Thus, the SYM system 100 continually predicts the spectrum usage in a subsequent time segment and interacts with the wireless communication system to attain a desired operation in the subsequent time segment. However, current (or previous) loading data is used in these determinations. Thus, the SYM system 100 does not directly intervene in servicing of communications by the base stations but provides operating rules that the wireless communication system employs in assigning resources within the system.

The SYM system 100 may be installed in a wireless communication system that services voice, video and data. In such an installation, the SYM system 100 will assist in charging subscribers other than for each minute of airtime used. In such case, a certain bundle of services (at a certain quality level) may be charged at a flat rate with the SYM system 100 recognizing demand for synchronous/ asynchronous services, time-sensitive/time-insensitive data services, premium/regular services over each corridor and controlling these services at a session layer to service the varying needs of the subscriber units operating within the system.

In a wireless communication system that provides both voice and data services, a distinction may be made with respect to when the service must be provided. In the case of a voice call, a user accesses the system when he or she so desires. Responsively, the system must attempt to service the voice call if it is supported by the system. With some data services, the system must also attempt to service the data call when initiated. Such immediate servicing may be required when a user requires immediate download of data to a portable computer through the wireless communication system.

During other data operations, however, the call is initiated by, or terminated to a machine. Examples of such machines include vending machines, remotely located oil well heads, electronic billboards, copiers and remote acquisition terminals, among others. Each of these types of machines may upload or download data to apprise a remote computer of its operation or to receive data updates for its future operations.

For example, the display of an electronic billboard is updated periodically, for example daily, twice daily, hourly, every fifteen minutes, etc. However, instead of using a landline to receive its update, or have the update hand-entered, the electronic billboard communicates with a remote computer via a wireless link serviced by the wireless communication system to receive its updates. Typically, the update is performed at an exact time interval. But, oftentimes, the billboard must be updated at non-periodic times as well. According to the present invention, updates are scheduled for particular time intervals but, if the servicing base station does not have sufficient capacity to service the update at the interval, the update is rescheduled and performed when sufficient capacity exists.

If an unscheduled update is required, the unscheduled update may also be disallowed until sufficient capacity exists. However, if the operator of the electronic billboard desires to make an update during a higher loading period, the electronic billboard operator may elect to pay a surcharge for accessing the system during the higher loading period. Other time insensitive, or substantially time insensitive data communications may be handled in a similar manner to load the wireless communication system during otherwise lightly loaded periods and to unload the wireless communication system during otherwise heavily loaded periods.

The SYM system 100 may be implemented in a variety of manners within the wireless communication system. The SYM system 100 may be distributed throughout the wireless communication system, with distributed components placed as required to collect needed information and to provide the appropriate operating signals 122. In one particular construction, at least some components of the SYM system 100 are co-located with a Mobile Switching Center (MSC). However, other of the components will be located within other portions of the wireless communication system. In its operation, the SYM system 100 enables Class of Service (CoS), allows spectrum management by corridors, tracks subscribers by class and enforces spectrum reservation policies that are consistent with the system operator's goals over each corridor.

Figure 2:
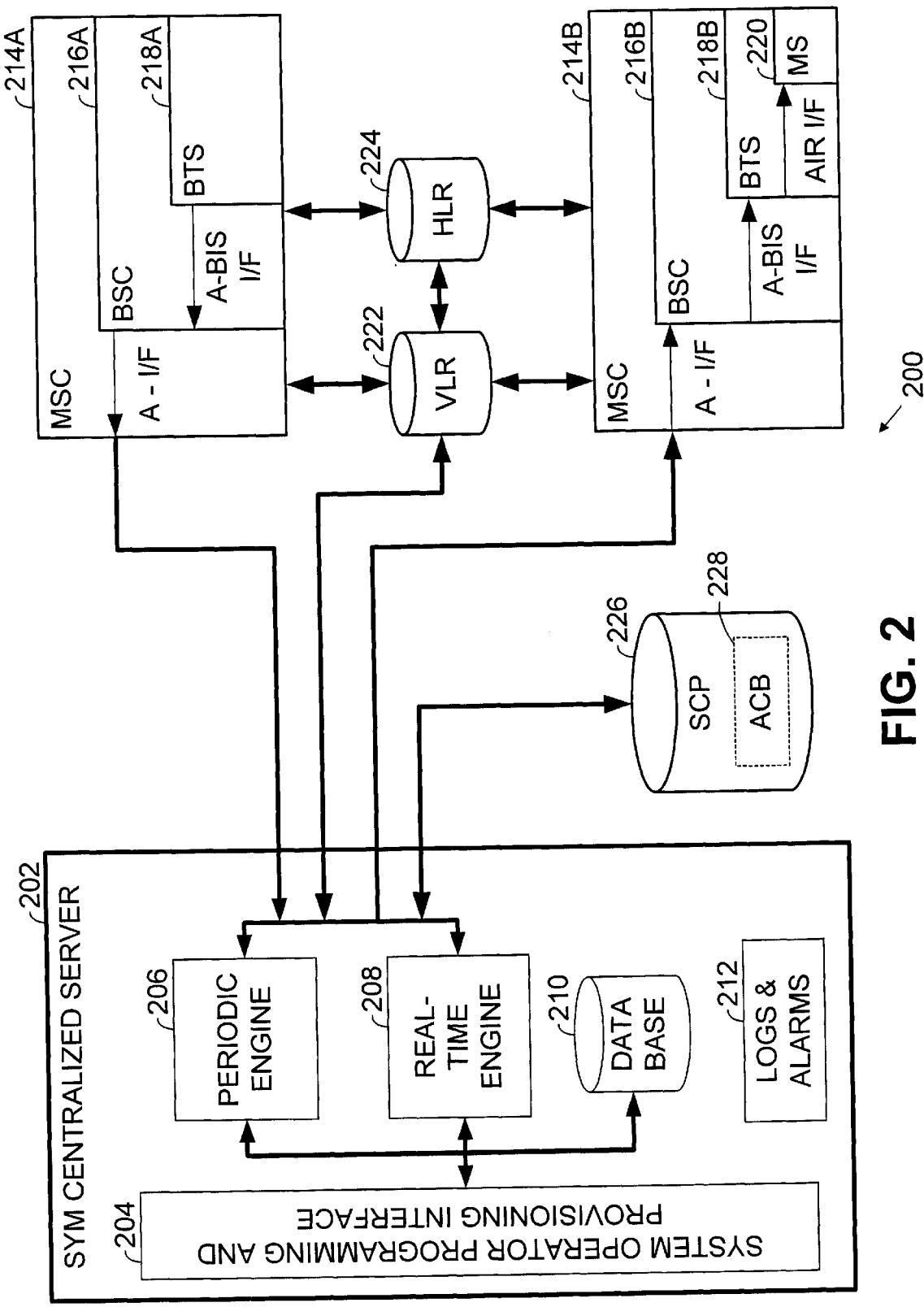
FIG. 2 is a block diagram illustrating a spectrum yield management system centralized server constructed according to the present invention and its intercoupling with components of a wireless communication system.

FIG. 2 is a block diagram illustrating a spectrum yield management system 200 centralized server 202 constructed according to the present invention and its intercoupling with components of a wireless communication system. The SYM centralized server 202 interfaces with various network entities for collection of Operational Measurement (OM) data, for accessing historical data and for delivering processed data in the form of periodic and real-time Admission Control Block (ACB) updates and service updates.

In the illustrated embodiment, the ACB 228 resides within a Service Control Point (SCP) 226 of the wireless communication system. By locating the ACB 228 within the SCP 226, operations according to the present invention may be more easily integrated into existing wireless communication systems. For example, in a wireless communication system that is constructed of components and software from various vendors and that supports Signaling System Seven (SS-7) operations, the SCP 226 will be accessed during call setup. Based upon the contents of the ACB 228 contained within the SCP 228, call setup may be altered (by preventing access to the system of particular classes of subscribers or by queuing calls for other classes of subscribers) according to the present invention to manage spectrum within the wireless communication system. Such an implementation may be performed in a manner consistent with the structure and operation of a Wireless Intelligent Network (WIN).

The SYM centralized server 202 includes a system operator programming and provisioning interface 204 that allows the system operator to access the SYM centralized server 202. The SYM centralized server 202 also includes a periodic engine 206, a real-time engine 208, a database 210 and a logs and alarm block 212. The SYM centralized server 202 couples to MSCs, Base Station Controllers (BSCs), Base Station Transceiving Subsystems (BTSs), a Visitor Location Register (VLR) 222 and a Home Location Register (HLR) 224. These components are generally known in the art and will not be described further herein except as to expand upon the principles of the present invention.

The SYM centralized server 202 communicates with the MSCs directly and with the BSCs through the MSCs via the A-interface. For example, the SYM centralized server 202 receives information directly from MSC 214A and sends information directly to MSC 214B. Such direct connection may be by way of a T-1 line or other suitable connection. The SYM centralized server 202 communicates indirectly with BSCs 216A and 216B via MSCc 214A and 214B, respectively, and respective A-interfaces. Communications with BTSs 216A and 216B, pass via MSCs 214A and 214B, respectively, BSCs 216A and 216B, respectively and respective A-Bis interfaces. For subscriber registration (subscriber location) information and service profile information, the SYM centralized server 202 interfaces directly with the VLR 222 and HLR 224.

During typical operations, the SYM centralized server 202 receives no information directly from subscriber units 220 operating within the wireless system. However, the SYM centralized server 202 does transmit information to subscriber units 220 via the MSC 214B, the BSC 216B and the BTS 218B as previously described and via an air interface to the subscriber units 220. The SYM centralized server 202 may send service updates, service option signals and other messages to subscriber units 220 via the overhead channel. Short Message Services (SMS), broadcast message and other techniques supported by the air Interface technology may also be in use. The air interface technology in use may be enabled by analog operations, time division multiple access operations, code division multiple access operations and other air interface technologies.

The SYM centralized server 202 hosts the analytical engines that process all data. The functionality is broken into two modules, the periodic engine 206 and the real-time engine 208. The periodic engine 206 is responsible for the collection and processing of data at a pre-determined interval. The real-time engine 208 is responsible for the collection and processing of any real-time information collected at network entities supported by the SYM centralized server 202. The periodic engine 206 is easily tuned to match existing OM collection cycles and existing Operation Sub-Systems (OSSs). Splitting the functionality into the periodic engine 206 and the real-time engine 208 allows system operators to use just one or both techniques and allows system operators to match techniques to the locations in which the SYM system is installed. As is appreciated, the wireless network implementation is highly dependent on the type of network technology (e.g., TDMA, CDMA and GSM) supporting the network.

Figure 3:
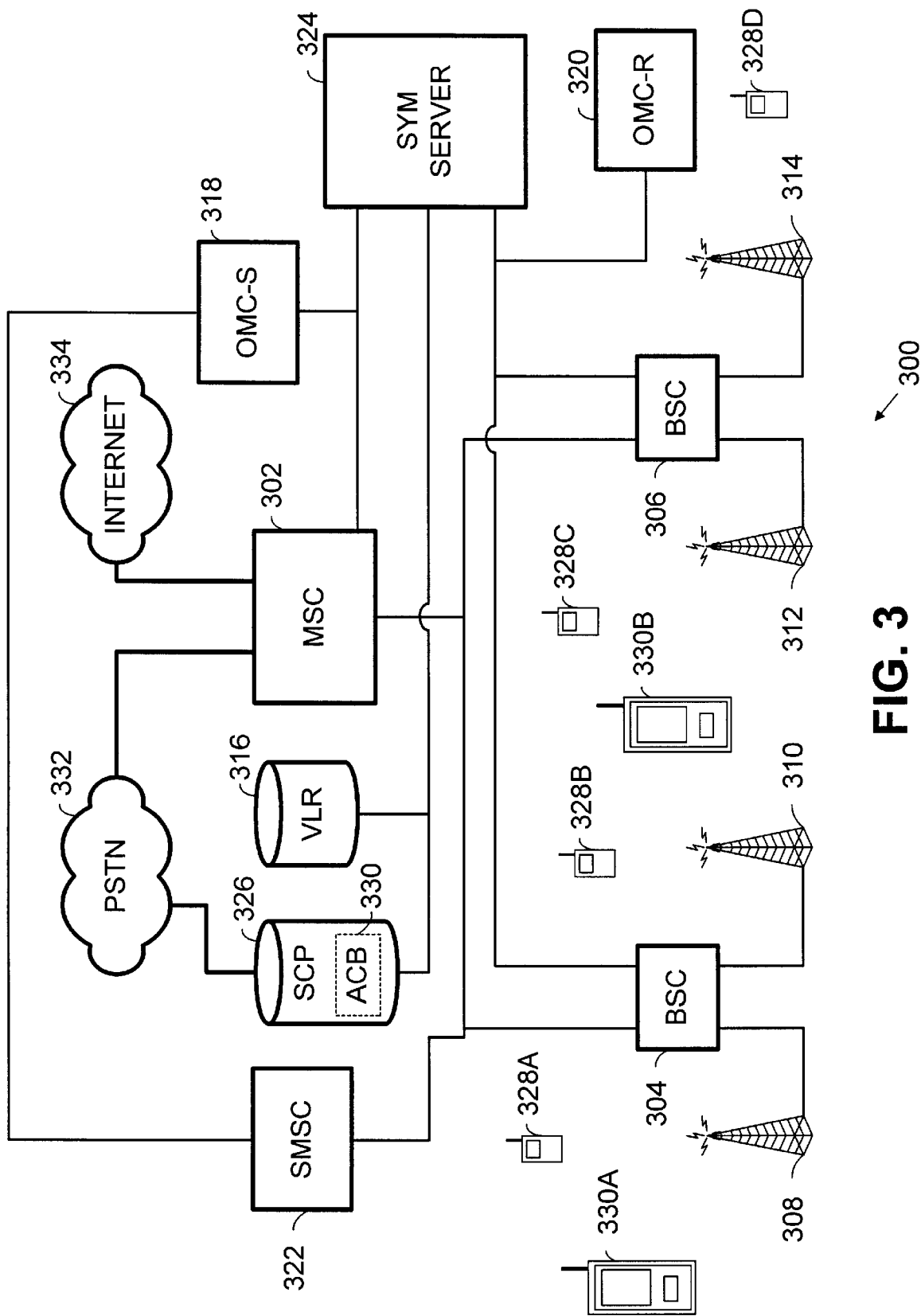
FIG. 3 is a system diagram illustrating the deployment of a spectrum yield management system constructed according to the present invention within a wireless communication system.

FIG. 3 is a system diagram illustrating the deployment of a SYM system 300 constructed according to the present invention within a wireless communication system. The installation illustrated is within a Global Standard for Mobile Communications (GSM) system. As shown, the SYM system 300 includes a SYM server 324 which couple to an MSC 302, a VLR 316, BSCs 304 and 306, an Operations and Maintenance Center—Switch (OMC-S) 318, an Operations and Maintenance Center—Radio (OMC-R) and a Short Message Service Center (SMSC) 322 of a wireless communication system. The SYM system 300 also includes an ACB 330 which is contained within a SCP 326 of the wireless communication system.

As is shown, each BSC 304 couples to a plurality of base stations, each of which supports operation within a particular cell, with each cell optionally including a plurality of sectors. BSC 304 couples to base stations 308 and 310 while BSC 306 couples to base stations 312 and 314. The OMC-S provides an open and standards compliant Operations Administration and Maintenance (OA&M) functionality to a GSM operator for managing multiple MSCs. The OMC-R provides access to the OA&M functions which makes it possible for the operator to centralize the OA&M functionality of the base stations. The MSC 302 couples to the Public Switched Telephone Network 332 and to the Internet 334. In some embodiments, an interworking function is required between the MSC 302 and the PSTN 332 and/or Internet 334.

The wireless communication system provides wireless service within a service coverage area. Operating within the service coverage area are a plurality of subscriber units. Voice subscriber units 328A–328D provide voice services for respective users. Data units (shown as vending machines 330A and 330B) are provided with wireless data services by the wireless communication system. Of course, other subscriber units are also supported by the wireless communication system. While some of some of the subscriber units require solely voice service and some require solely data service, other subscriber units may require both voice and data services.

The wireless communication system illustrated is designed so that communication trunks connect the base stations 308, 310, 312 and 314 to the BSCs 304 and 306 have ample capacity to carry a maximum base station loading. Thus when wireless networks become loaded and calls are blocked, the source of congestion is generally the air interface between the base station and the subscriber unit. This source of the congestion may be either the control channels used for signaling or may be traffic channels. The SYM server 324 tracks usage of the channels to identify bottlenecks within the wireless communication system. To make effective use of current demand information, it is important that the information be available in real-time to the SYM server 324.

The most accurate radio resource usage information is generally available at the base stations. Base stations typically collect such information over a period of time (15–30 minutes) and download this OM data to the BSC/MSC or an Operations Administration and Provisioning (OAM&P) entity in the network. In a mobile network where subscribers in an urban area move at 60 mph, a typical 2-minute call can span several base stations. An accident on an urban highway can trigger mass calling in a very short time span.

Thus, according to the present invention, the OM data is collected over a relatively shorter time period and provided to the SYM system for subsequent operations. Because the collection of OM data may have adverse effects on the base stations collecting the information (due to limited CPU capacity), the SYM system employs a triple-mode approach to real-time data collection. In the triple-mode approach, data is collected in ordinary fifteen to thirty-minute OM time intervals. However, data is also collected from each base station when the loading (or loading rate) on the base station exceeds a threshold (BTS watermark). Further, loading trend data is also collected, such loading trend data traced by a BTS trend analyzer present in the BTS. The BTS trend analyzer may also be present in a BSC that controls a plurality of base stations.

A BTS Operational Measurements (OMs) unit collect various radio usage parameters. After the collection period expires, these OMS unit are typically downloaded to the BSC and other OA&M platforms. The SYM server 326 downloads this data. Radio resource statistics such as traffic and control channel usage are important to SYM server 324 features such as load-leveling, under-capacity management, service priority management, subscriber priority management, etc. By tracking spectrum usage, the SYM server 324 computes the surplus spectrum at each BTS. Based on this knowledge, the SYM system is able to provide feedback to the wireless network regarding conventional and supplementary services that can be supported at each corridor, at the current time.

Because BTS OMs unit information is typically delayed by 15–30 minutes, some method of collection of real-time information is needed, particularly if the real-time information deviates from expected levels. BTS watermarks are an interrupt driven scheme designed to collect critical radio usage information in real-time, without creating an excessive overhead in terms unit of signaling-messages between the BTS/BSC and the Centralized SYM server, and BTS/BSC CPU usage. In a typical operation, a high BTS watermark and a low BTS watermark are established for available BTS channels. These BTS watermarks signal an over and under utilized situation at each BTS. Each time the BTS resource reaches a BTS watermark a signal is sent to the SYM server 324 to apprise the SYM server 324 of such under or over utilization. Watermarks are also used to implement dynamic, demand-driven, spectrum reservation schemes. A BTS watermark scheme will be discussed in detail with reference to FIG. 10.

Figure 4:
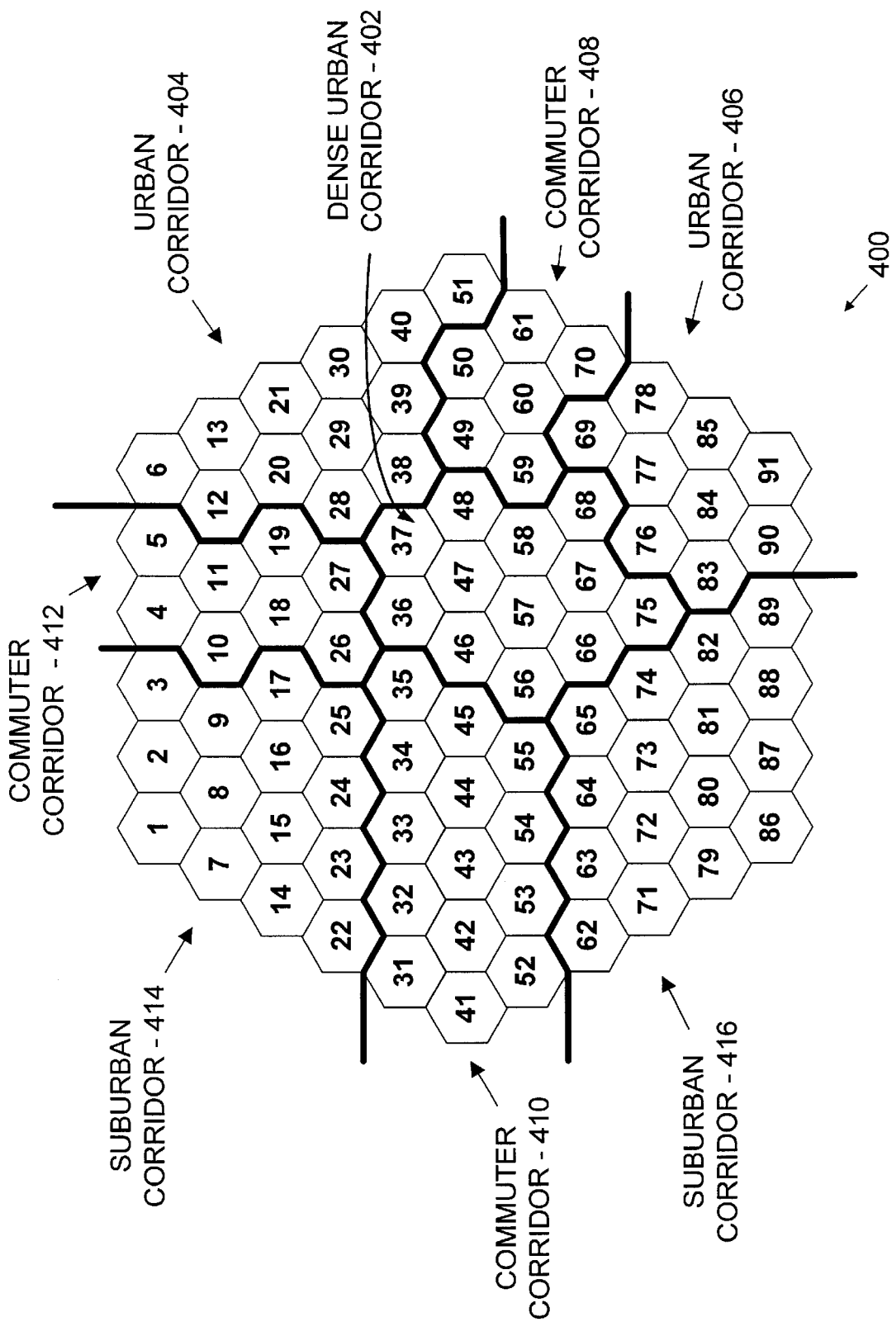
FIG. 4 is a diagram illustrating a plurality of cells serviced by a wireless communication system that are divided into a plurality of corridors according to the present invention.

FIG. 4 is a diagram illustrating a plurality of cells serviced by a wireless communication system that are divided into a plurality of "corridors" according to the present invention. A service coverage area 400 of a wireless communication system includes 91 cells, numbered cell 1 through cell 91. According to the present invention, the service coverage area 400 is divided into a plurality of corridors, each of which includes at least one cell. The corridors are established by the system operator based upon subscriber load patterns within a group of cells and a desire to manage subscriber load within the group of cells. For example dense urban corridor 402 corresponds to a downtown area in which subscriber load is heaviest during working hours. Commuter corridors 408, 410 and 412 are heavily loaded during the commuting hours. Urban corridors 404 and 406 have heavier loading when subscribers are shopping, heading home, etc. Finally, suburban corridors 414 and 416 provide coverage in residential areas and are loaded heavier at night.

In the SYM system terminology a corridor is different from the concept of a paging "zone." A paging zone is a group of BTSs lumped together with the intention of optimizing paging. When a subscriber unit crosses a paging zone boundary, it registers with the wireless network. In the event of an incoming call, the wireless network pages the mobile in the last paging zone that the subscriber unit registered (instead of the entire coverage area), thus increasing paging efficiency. SYM corridors are designed based upon system operator operating goals. The System operator divides its coverage area into corridors that make sense from a business, tariff, user-mobility, and loading etc. viewpoint. The SYM system uses these definitions and manages spectrum, services, and subscribers, one corridor at a time. Wireless networks are dynamic and service demand, subscriber presence, subscriber mobility vary greatly from one corridor to another. The usage patterns when plotted against time may be different for each corridor, may follow a certain pattern, patterns may be similar for each weekday or they may be different. With the SYM system defined wireless corridors, system operators can fine-tune the usage of their spectrum, by location, manage the subscriber priorities, service priorities to match up with the corridor patterns, thus maximizing revenues.

According to the present invention, the load within these differing corridors is tracked. For each of these corridors, the system operator has established various operating goals which typically relate to desired loading levels. Based upon these desired loading levels, the system operator establishes loading thresholds. When the actual subscriber loading in these corridors compares unfavorably to a respective loading threshold, the SYM system may take various actions. These actions include providing service option signals to subscribers operating within the corridor, limiting access to the system by certain classes of subscribers and reserving bandwidth for other classes of subscribers, among others. The service option signals provide pricing incentives and disincentives that cause targeted subscribers to increase usage or to decrease usage, respectively. By limiting access to the system in the corridors, usage of course decreases.

Besides current demand information, other key inputs to the SYM system are potential demand for services and historical demand for services. The historical demand represents corridor loading from a historical perspective. Potential loading, on the other hand, represents the number of subscribers that are registered but not active in ongoing communications. In a wireless network, service demand is directly proportional to the number of subscribers in that location.

By tracking the subscribers in a corridor, the SYM system is able to predict usage patterns over the next time-slice. Knowledge of subscribers presence or "location tracking" allows the SYM system to implement ClassOfService (CoS) in wireless networks. In wireless network design the probability by which the subscriber is not able to complete a call due to a lack of resource is referred to as blocking ratio. In current wireless networks, resources are granted on a first-come-first-serve basis. However, the SYM system uses the potential demand knowledge in a corridor to drive dynamic reservation schemes that adjust reservation levels for various class of subscribers (Premium/Regular) to provide a higher/lower cost of service. Higher-class users have a greater level of resources dedicated for them and hence a lower blocking-ratio.

When a registration event happens at a subscriber unit, it sends a location update to the VLR. This event is triggered by various registration schemes, such schemes including zone-based registration, timer-based registration, power-up registration, power-down registration and ordered registration. Zone based registration can be used by the SYM system, provided corridors span one or more zones. For fixed services like telemetry, location tracking is not an issue. However, while location tracking is not needed for such subscribers, power-up and power-down registration is useful in determining if the subscriber unit is turned on or off.

The SYM system also uses location-tracking information in demand stimulation. The SYM system uses accurate knowledge of the subscriber mix in making promotional offers to discount subscribers inviting them to make calls. Using the real-time knowledge of spectrum use, the SYM system can make use of the idle spectrum to deliver value added data services like horoscope updates, lottery results, sports scores etc.

Figure 5:
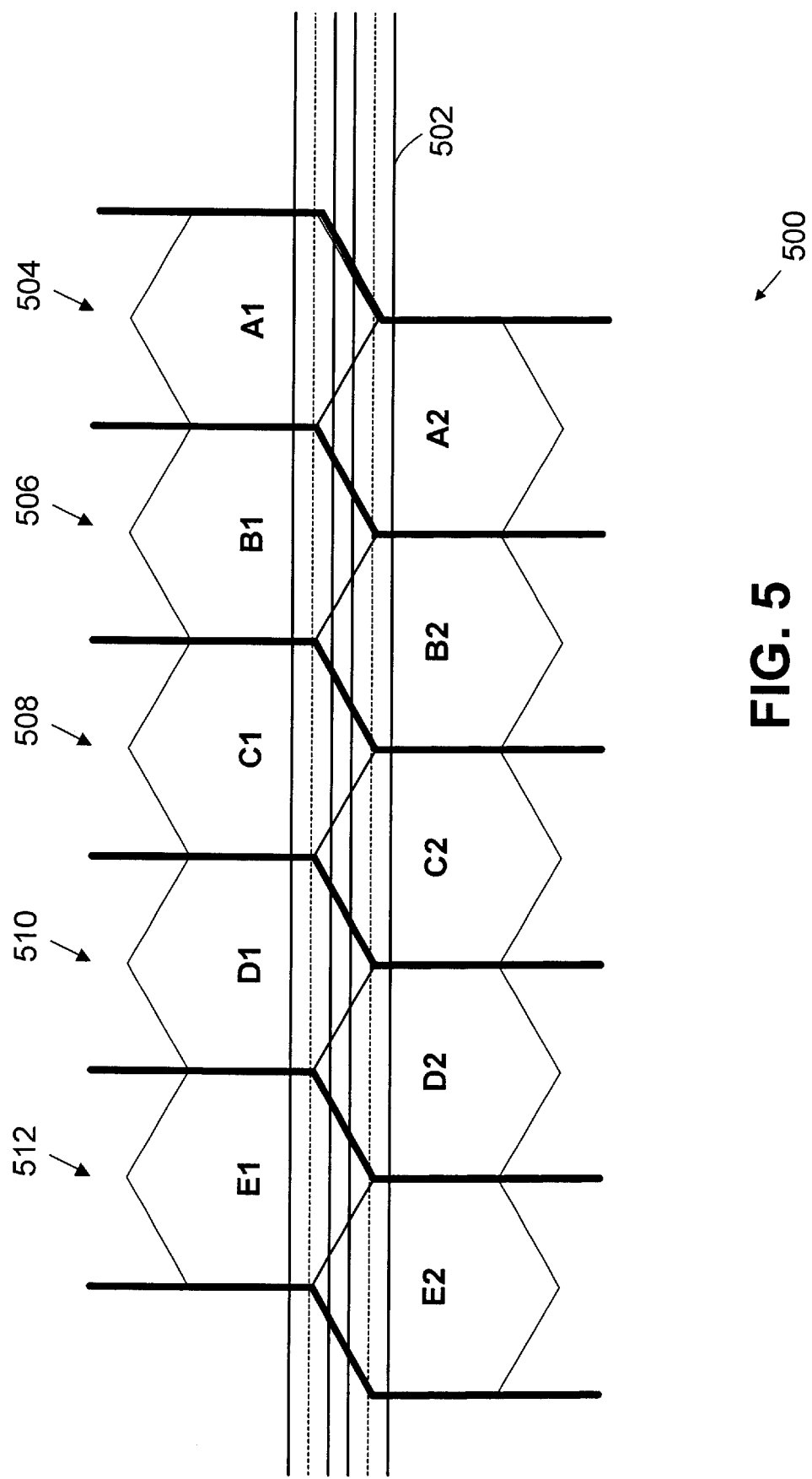
FIG. 5 is a diagram illustrating a plurality of cells serviced by a wireless communication system that are divided into a plurality of sub-corridors along a highway.

FIG. 5 is a diagram illustrating cells serviced by a wireless communication system that are divided into a plurality of sub-corridors along a highway according to the present invention. While FIG. 4 illustrated the manner in which a service coverage area may be broken into a plurality of corridors, FIG. 5 illustrates how such a corridor may subdivided into a plurality of sub-corridors.

An illustrated section of the wireless communication system 500 includes cells A1 and A2, B1 and B2, C1 and C2, D1 and D2, and E1 and E2. Each set of two cells that include a common lettering convention form a sub-corridor. Thus, cells A1 and A2 form sub-corridor 504, cells B1 and B2 form sub-corridor 506, cells C1 and C2 form sub-corridor 508, cells D1 and D2 form sub-corridor 510, and cells E1 and E2 form sub-corridor 512. As illustrated, a highway 502 runs across the sub-corridors 504, 506, 508, 510 and 512 in the listed sequence, with each of the sub-corridors considered a commuting sub-corridor. As an example of operation, traffic flows mostly from left to right during a morning commute and mostly from right to left during an afternoon commute.

The SYM system tracks potential demand by determining the number of subscribers in a given sub-corridor. The SYM system uses location based and timer based registration events to build sub-corridor demographic information. The granularity of this location information based on registrations may be adjusted as is required but generally depends on the frequency of the registrations and mobility of the user. The SYM system tracks location of all subscriber units within the system during all times. Thus, with reference to the sub-corridors of FIG. 5, registrations within any of the sub-corridors 504–512 may be used by the SYM system to track potential demand. Calls being serviced by the base stations of the sub-corridors are employed to track real-time loading in each of the sub-corridors 504–512.

Potential load may be more effectively tracked by determining the physical location of subscriber units. Time of Arrival (TOA), Enhanced Observed Time of Difference (E-OTD) and Observed Time Difference (OTD) features may be used to track the actual location of subscribers within the sub-corridors 504–512. The E-OTD method is based on the observed time of difference between the arrival bursts from nearby pairs of BTSs. The subscriber unit performs the measurements. The positioning can be either handset based or handset assisted. In a handset based location determination, the subscriber unit performs the OTD signal measurement and computes its own location estimate. In handset assisted determination, the subscriber unit receives the OTD signal, reports OTD signal measurements to the network and the network computes the subscriber unit's location estimate. Further, GPS positioning may also be employed to determine subscriber unit position.

Actual load within one sub-corridor may be employed to predict load within an adjacent sub-corridor. Such load prediction may be most readily enabled during a morning or afternoon commute. Actual load will increase from lower levels to higher levels as commuters use the highway 502. For example, with traffic generally moving from left to right during a morning commute, load will increase in sub-corridor 512 before increasing by a similar level in sub-corridor 510, 508, 506 and 504. Thus, the loading experienced in sub-corridor 512 may be employed to predict load in cells 510, 508, 506 and 504 during later time periods. Spectrum may be managed in some of the sub-corridors based upon actual loading in other of the sub-corridors.

Figure 6:
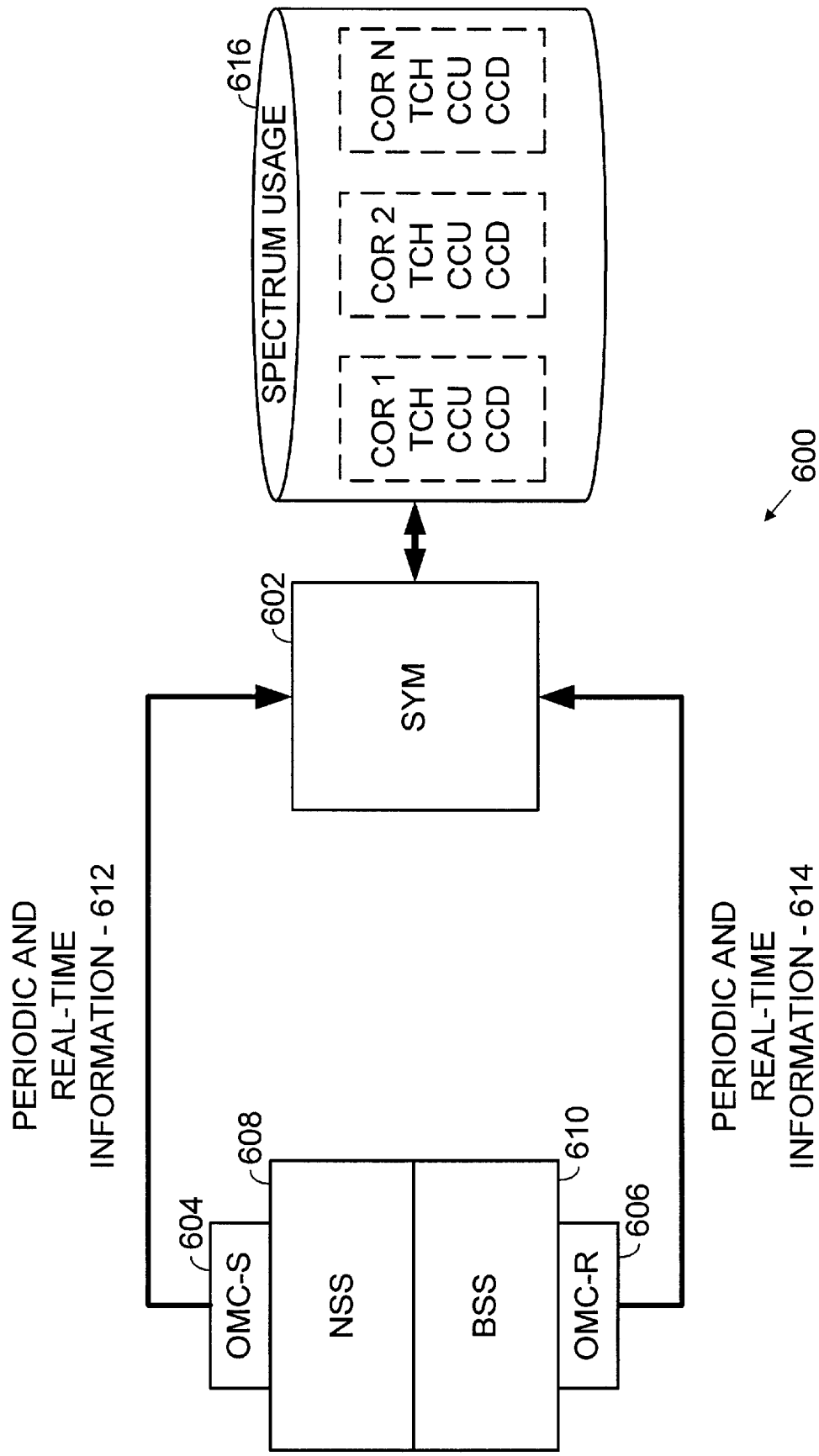
FIG. 6 is block diagram illustrating the structure of a spectrum yield management system employed in determining subscriber load within a plurality of corridors according to the present invention.

FIG. 6 is block diagram illustrating the structure of a spectrum yield management system constructed according to the present invention employed in determining subscriber load within a plurality of corridors according to the present invention. As is shown, a SYM server 602 couples to an OMC-S 604 which couples to a Network SubSystem (NSS) 608 of a wireless communication system. The SYM server 602 receives periodic and real-time information from the OMC-S 604. The SYM server 602 also couples to an OMC-R 606 which couples to a Base Station System (BSS) 610 of the wireless communication system. The SYM server 602 also receives periodic and real-time information from the OMC-R 606. Based upon the periodic and real-time information received, the SYM server 602 generates spectrum usage information 616 for the corridors of a wireless communication system.

Radio resource usage within corridors can be broken down into traffic usage and control channel usage. In GSM networks a subscriber unit is said to be in dedicated mode when a traffic channel (TCH) is dedicated to it. Signaling done during the duration of the call is done over the traffic channel and is referred to as Slow Associated Control Channel (SACCH) signaling and Fast Associated Control Channel (FACCH) signaling. Other GSM 'common' channels on the downlink (BTS to subscriber unit) are used for various other control functions. These control channels include the synchronization channel (SCH), the broadcast channel (BCCH), the frequency correction channel (FCCH) and the paging channel (PAGCH).

The OMC-R 606 and OMC-S 604 collect OM unit relating to spectrum usage at each BTS. To make spectrum management decisions the SYM system collects this information both periodically and when usage deviates from historical levels. The SYM system also accepts real-time updates from BTSs via the BTS watermark concept explained earlier. With the information compiled, the SYM server 602 generates traffic channel usage and control channel usage for both the uplink (control channel uplink—CCU) and the downlink (control channel downlink—CCD).

In GSM networks, a 15-minute period is typical of OM collection. During a 15-minute period, various traffic and control channel usage is collected at each BTS. At the end of the collection period, this information is downloaded to the OMC-R/OMC-S. The SYM system accesses the OMS-R and OMC-S units to effectively obtain periodic snapshots of current usage. This non-realtime input is used by the SYM system in determining how close the current usage pattern track historical loading levels. Based on this delayed input, the SYM system is able to perform rough projections on spectrum usage over the next time interval. If the instantaneous demand for spectrum resources changes, the SYM system relies on other real-time inputs to make adjustments to this projection.

One of the inputs to the SYM system is the access class, and the number of idle/active subscribers in a given corridor. By keeping track of the number of idle/active subscribers within a corridor, the SYM system is able to estimate potential demand. Subscriber units register with the MSC/VLR during various subscriber unit and network events such as power-up operations, change of location area and the expiration of a timer on the subscriber unit. The SYM system analytical engine uses the corridor demographic database to keep track of the potential demand for services in each corridor. By keeping a per corridor count of subscribers in each class, the SYM system is able to access to resources based on the access-class of the subscriber. Knowing how many subscriber of each class is key information needed in maintaining an operator determined Quality of Service (QoS) for each access-class, over each corridor.

An office parameter on the MSC dictates the maximum duration after which, each subscriber unit is required to send a registration. The subscriber unit transmits the information over the RACH to the BSS 610. The BSS 610 resultantly sends a location update request to the MSC/VLR. If the LocAreaID has changed, the MSC sends a location update message to the HLR. The SYM system takes this location update message from each subscriber and updates its internal corridor based demographic database. Every-time a subscriber unit crosses a location area boundary, a location update message that includes the LocAreaID and Cell-id is sent to the MCS/VLR and the HLR. The SYM system processes this information to update its internal demographic database.

FIGS. 7A and 7B are block diagrams illustrating classes of subscribers contemplated according to the present invention. In existing second generation (2G) wireless networks, spectrum is granted on a first-come-first-served basis. In general, no priority or reservation scheme is implemented. For the creation of priority schemes, pre-emption schemes and the effective management of spectrum for voice/data services in existing 2G and third generation (3G) networks a mechanism is needed to define the service-level/priority levels. The SYM system employs an Access-Class methodology to classify requests for spectrum resources. The Access-Class methodology attempts to classify and order all signaling voice and data services that require the use of spectrum resources.

An Access Class/Access Priority methodology 700 for a regular system is illustrated in FIG. 7A and includes (in descending order of priority), a Premium Voice class 702, a Regular Voice class 704, a High-priority Short Message Service (SMS) class 706, a Discount Voice class 708, a Premium Data (circuit-switched, high data rate) class 710, a Deep-Discount Voice class 712, a Regular Data/Telemetry class 714 and a Low-Priority SMS class 716. Using such a mechanism to prioritize all traffic, the SYM system can look at current and near-term future usage of spectrum and let the network know what access-class can be supported at the current time. That knowledge is delivered to an ACB and used in subsequent operation in allocating spectrum within the wireless communication system.

FIG. 7B illustrates an Access Class/Access Priority methodology 750 for a General Packet Radio Service (GPRS) system is illustrated in FIG. 7A and includes (in descending order of priority) a Premium Data class 752, a Regular Data class 754 and a High-priority Short Message Service (SMS) class 756.

Figure 8:
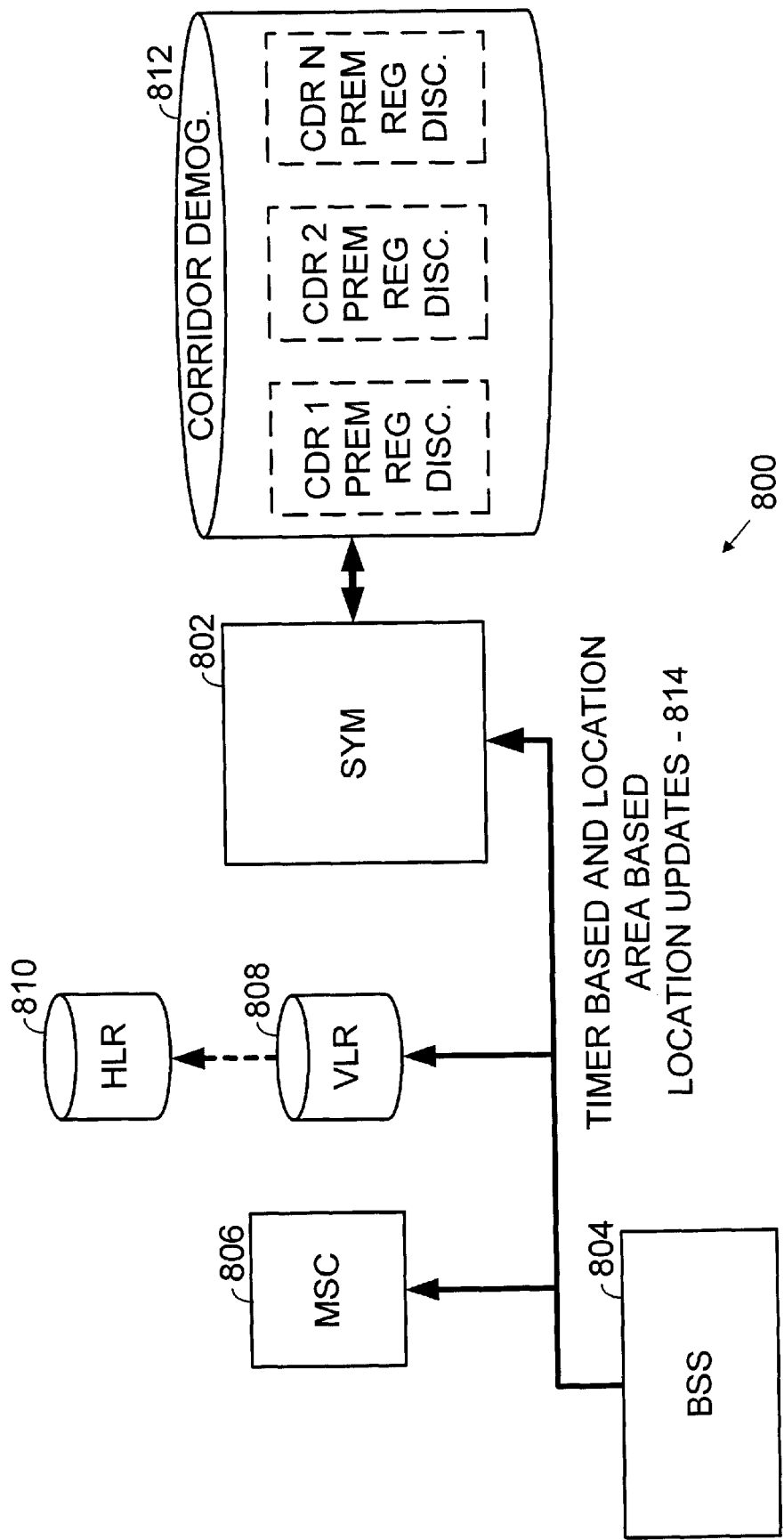
FIG. 8 is block diagram illustrating the structure of a spectrum yield management system employed in determining subscriber demographics within a plurality of corridors according to the present invention.

FIG. 8 is block diagram illustrating the structure of a spectrum yield management system employed in determining subscriber demographics within a plurality of corridors according to the present invention. As is shown, a SYM server 802 couples to an MSC 806, a BSS 804, a VLR 808 and an HLR 810 and receives timer based and location area based location updates 814 for subscribers operating within a serviced wireless communication system. Based upon the information received, the SYM server 802 compiles demographic information for a plurality of corridors into which the service coverage area of the wireless communication system is subdivided.

In generating the timer-based information, an office parameter on the MSC 806 dictates the maximum duration after which each subscriber unit is required to send a registration. In a GSM wireless system, the subscriber unit transmits the information over a RACH to the BSS 804. The BSS 804 sends the location update request to the MSC 806/VLR 808. If the location area identity has changed, the MSC 806 sends a location update message to the HLR 810. The SYM server 802 takes each location update message from each subscriber unit and updates its internal corridor based demographic information 812. Such operations are also performed every time a subscriber unit crosses a location area boundary. Similar operations would also be performed in CDMA and TDMA systems.

Corridor demographic information 812 is maintained for each corridor serviced by the SYM system. For each corridor, the demographic information 812 indicates loading for each class of a plurality of classes. For example, the corridor demographics 812 illustrated track the loading for a premium user class, a regular user class and a discount user class. Of course, in different embodiments, corridor demographics could be kept for other classes also.

FIGS. 9A and 9B are diagrams unit illustrating examples of ACBs (Admission Control Blocks) compiled and constructed according to the present invention. Using current demand, historical demand and potential demand information for a subject corridor, the SYM system provides feedback to the wireless network entities in the form of an updated ACB. The ACB is a module that plugs into the Call-Processing fabric of a wireless network. The ACB is memory resident in the modules that make channel allocation decisions (BSC/MSC). The SYM system is responsible for updating these ACBs in real-time. System operators define a service hierarchy for Voice/Data/SMS services. Based on the unique dynamics of a particular location in a coverage area, the SYM system specifies the lowest level service or 'Access Class' supported in each corridor.

In the present embodiment, the SYM system provides ACBs of two types, one for mobile services, and, another for fixed services. Fixed ACB has a finer level of granularity and is meant for fixed services like telemetry, meter-reading etc. Mobile-ACBs define the highest service-level supported for each corridor. System operators can build interfaces to various point-to-point and point-to-multi-point Voice/Data/SMS services that use the ACBs for admission control.

These services leverage surplus bandwidth to drive these non-traditional services based upon the availability of system resources. In this fashion, these services may be provided without adversely affecting the availability of the system for voice users.

FIG. 9A illustrates a fixed ACB 900 for a plurality of cells, cell 1 through cell 8. For each cell, the ACB 900 includes an Access Class, which indicates the lowest priority class for which the cell will provide service. The ACB 900 also includes the free bandwidth for each cell and a time stamp for each cell that indicates through what time the information is valid. For cells 1 through 8, the ACB 900 includes ACB records 902 through 916, respectively.

FIG. 9B illustrates a mobile ACB 950 for corridors 1, 2 and three. For each corridor, the mobile ACB includes an Access Class, which indicates the lowest priority class for which the corridor will provide service. The ACB 950 also includes a time stamp for each corridor through which the respective mobile ACB 950 is valid. As is shown, the mobile ACB 950 includes mobile ACB records 952, 954 and 956 for corridors 1, 2 and 3, respectively.

Figure 10:
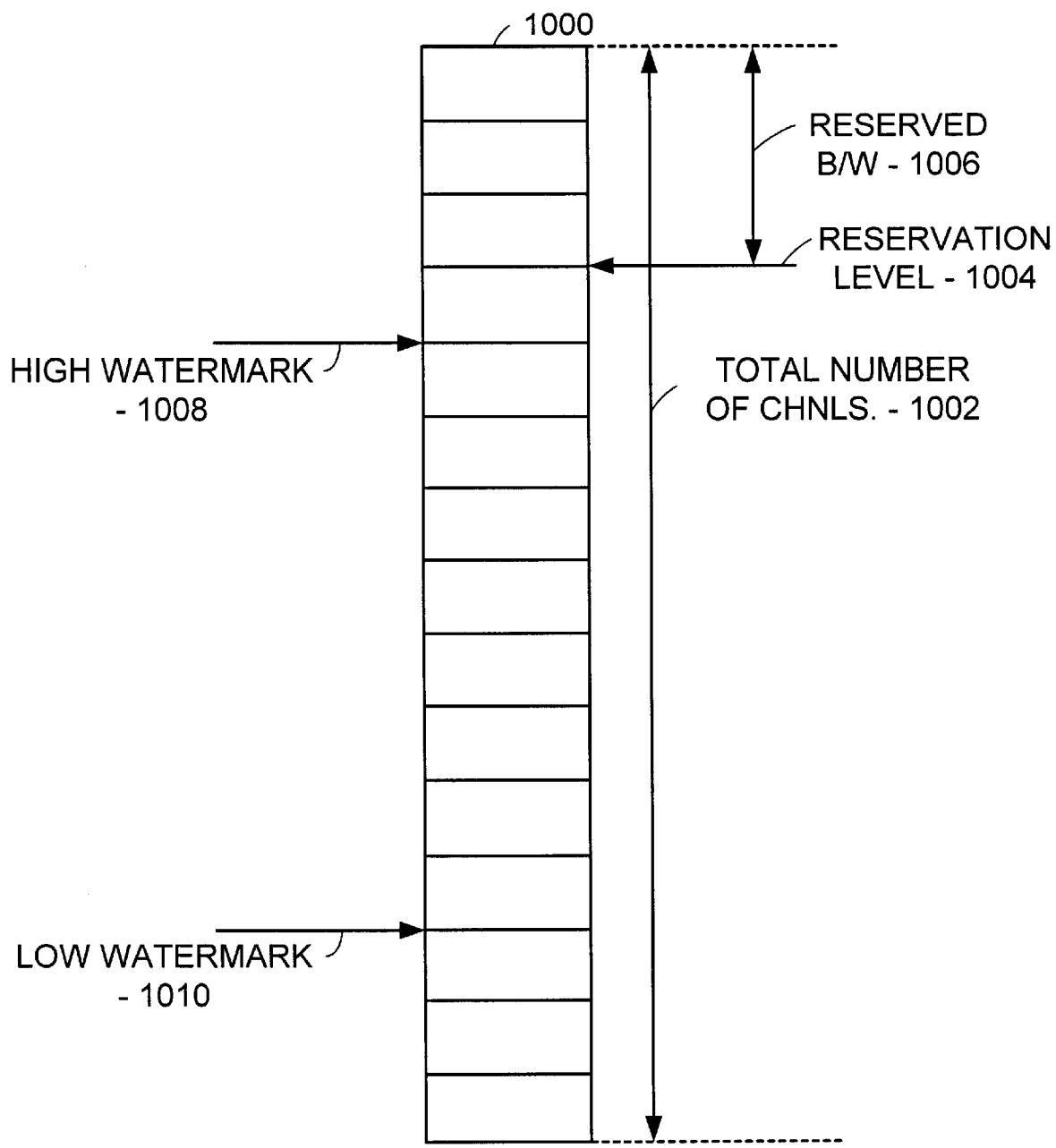
FIG. 10 is a block diagram illustrating the manner in which BTS watermarks are used according to the present invention.

FIG. 10 is a block diagram illustrating the manner in which BTS watermarks are used according to the present invention. The channels in a particular cell are indicated at reference numeral 1000 and include a total number of channels 1002. Such total number of channels 1002 varies from system to system and may vary from cell to cell.

The SYM system has access to historical spectrum usage information for each base station. Based on this historical usage, the SYM system generates a BTS watermark profile for each BTS for each day of the week. Before the start of the traditional peak-period (early morning), the SYM system downloads a respective BTS watermark profile to each base station. The BTS watermark profile typically includes a high watermark 1008 and may include a low watermark 1010. If the spectrum usage information exceeds the high watermark 1008 (or goes below the low watermark 1010), the base station sends a realtime-update to the SYM system that includes details of the instantaneous spectrum usage. The SYM system uses this information to make adjustments to the loading estimates that were made based upon loading data from a prior loading cycle. When a message is sent in response to the crossing of a watermark, a countdown timer initiates, restraining the BTS from sending additional messages to the SYM system until the end of the timer period (5–10 minutes). With the real-time updating mechanism described above, messaging between the base station and the SYM system is kept to the minimum.

System operators can manually tune the BTS watermark profile for special operating situations such as baseball games, football games, Mother's day, etc. within those corridors that will likely be affected by the operating situations. For example, during a football game, usage within a cell servicing the football stadium will be heavily used. Thus, special BTS watermarks may be established upon which the SYM system will manage spectrum to guarantee service for certain class(es) of subscribers.

The BTS watermarks may also be used in altering normal operations of the respective base station (these operations may also be considered indirect with the SYM system altering a respective ACB for the base station). In an example of such an operation, when a high BTS watermark 1008 is crossed, the SYM system initiates reservation for a premium class of subscribers. In such case, the SYM system designates a reservation level 1004, above which is reserved bandwidth 1006 for the premium class of subscribers. When established, an affected base station will allocate the reserved bandwidth 1006 only for premium class subscribers, and not any lesser class. In a variation of the reservation scheme, calls intended for premium subscribers are queued for delivery if all available channels are allocated when a call for a subscriber of the premium class is incoming. Further, outgoing calls for a premium class member are queued until a channel is available.

When the total number of allocated channels moves below the reservation level, subscribers of other classes may be allocated. The BTS watermarks/reservation scheme described above supports two classes of subscribers, premium and regular. The concept can be extended to support 'n' classes of subscribers with 'n–1' high-watermarks.

The low BTS watermark 1010 is designed for detecting periods of excessive over-capacity and can be used to stimulate demand in all or some classes of users using promotional pricing schemes, etc. The low BTS watermark 1010 (and the high BTS watermark 1008) may be considered as loading thresholds to which the actual loading in a cell/sector/corridor is compared. When the comparison is unfavorable (less than a low BTS watermark 1010 or greater than a high BTS watermark 1008), a service option signal may be transmitted to subscriber units operating in the cell/sector/corridor. When loading is below the low BTS watermark 1010 a service option signal is sent to encourage usage within the cell/sector/corridor. However, when loading is above the high BTS watermark 1008, a service disincentive is sent to discourage additional usage by regular class subscribers.

Additionally, when the actual loading compares unfavorably to the high BTS watermark 1008, ACBs may be updated so that access to the base station is limited. When operation is limited in this manner, only a premium class of subscribers may be allowed access to the base station. As another example of limiting operations, time indifferent data calls may be terminated, some classes may be precluded access to the base station or other services may be reduced so as to reduce loading on the base station.

The BTS watermark levels are typically computed for a 24-hour period (based on historical levels for each day-of-week) and a 'BTS Watermark Profile' is downloaded to each BTS at the beginning of the day. Thus if current usage follows historical trends no additional messages are sent, further reducing the real-time messaging impact on both the messaging channels, and, the SYM system computations. A BTS Watermark Profile will be discussed with reference to FIG. 15.

BTS trend analyzers may be employed to detect sudden changes in radio-resource usage before the spectrum usage reaches a critical level. An accident on a highway can cause a sudden increase in rate at which channels are allocated. In this scenario, detecting the sudden spike in real-time would be crucial in adjusting channel reservation levels to make sure that blocking-ratios for Emergency/Premium and Regular users are adjusted dynamically.

The BSC control channel assignment and the BTS analyzer could potentially reside on the BSC and provide real-time message interrupts to the SYM system, when such events occur. BTS trend-analyzers would thus detect impending congestion and when communicated to the SYM system, would allow it to be pro-active in the management of unseasonal, unpredictable, unique phenomenon's in a wireless network. The SYM system then would manage the available spectrum according to the goals of the system operator.

Figure 11:
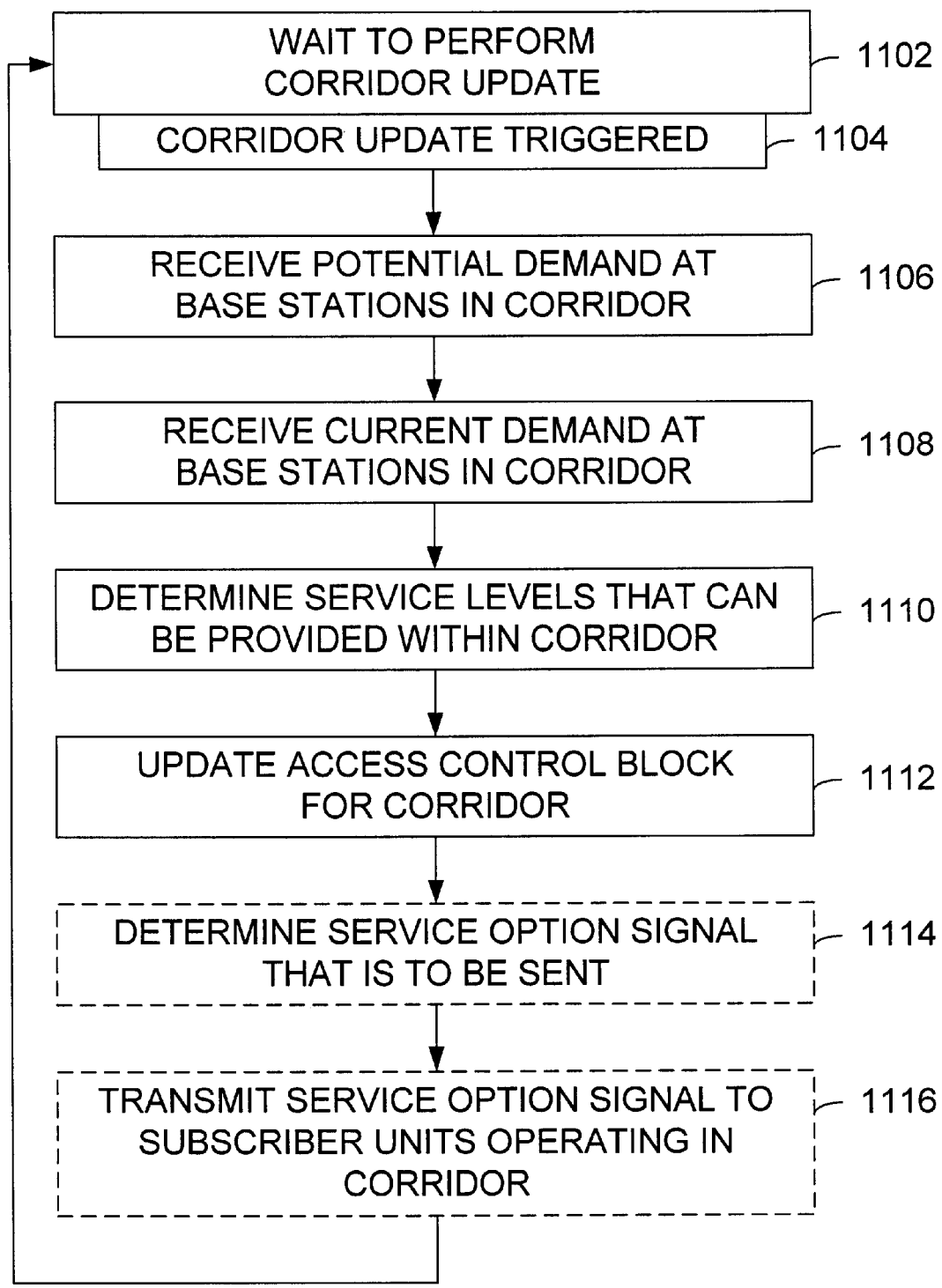
FIG. 11 is a logic diagram illustrating operation according to the present invention in collecting subscriber load data in a plurality of corridors and updating system operator parameters accordingly.

FIG. 11 is a logic diagram illustrating operation according to the present invention in collecting subscriber load data in a plurality of corridors and updating system operator parameters accordingly. At step 1102, the SYM system waits to perform an ACB corridor update. When a triggering event is received at step 1104, the SYM system seeks and receives potential demand information at base stations in the subject corridor at step 1106. Triggering events may be the expiration of a periodic timer, notification from a base station that a BTS watermark has been passed or another event which initiates an update by the SYM system.

At step 1108, the SYM system seeks and receives current demand (real-time) at base stations in the corridor. Based upon the information received, the SYM system determines service levels that can be provided within the corridor at step 1110. Next, the SYM system updates the ACB for the corridor at step 1112. If required, the SYM system then determines a service option signal that is to be sent to subscriber units in the corridor at step 1114. Finally, at step 116, the SYM system transmits the new service option signal to subscriber units operating in the operating in the corridor, altering accessibility in the corridor and attempting to alter subscriber loading in the corridor.

Figure 12:
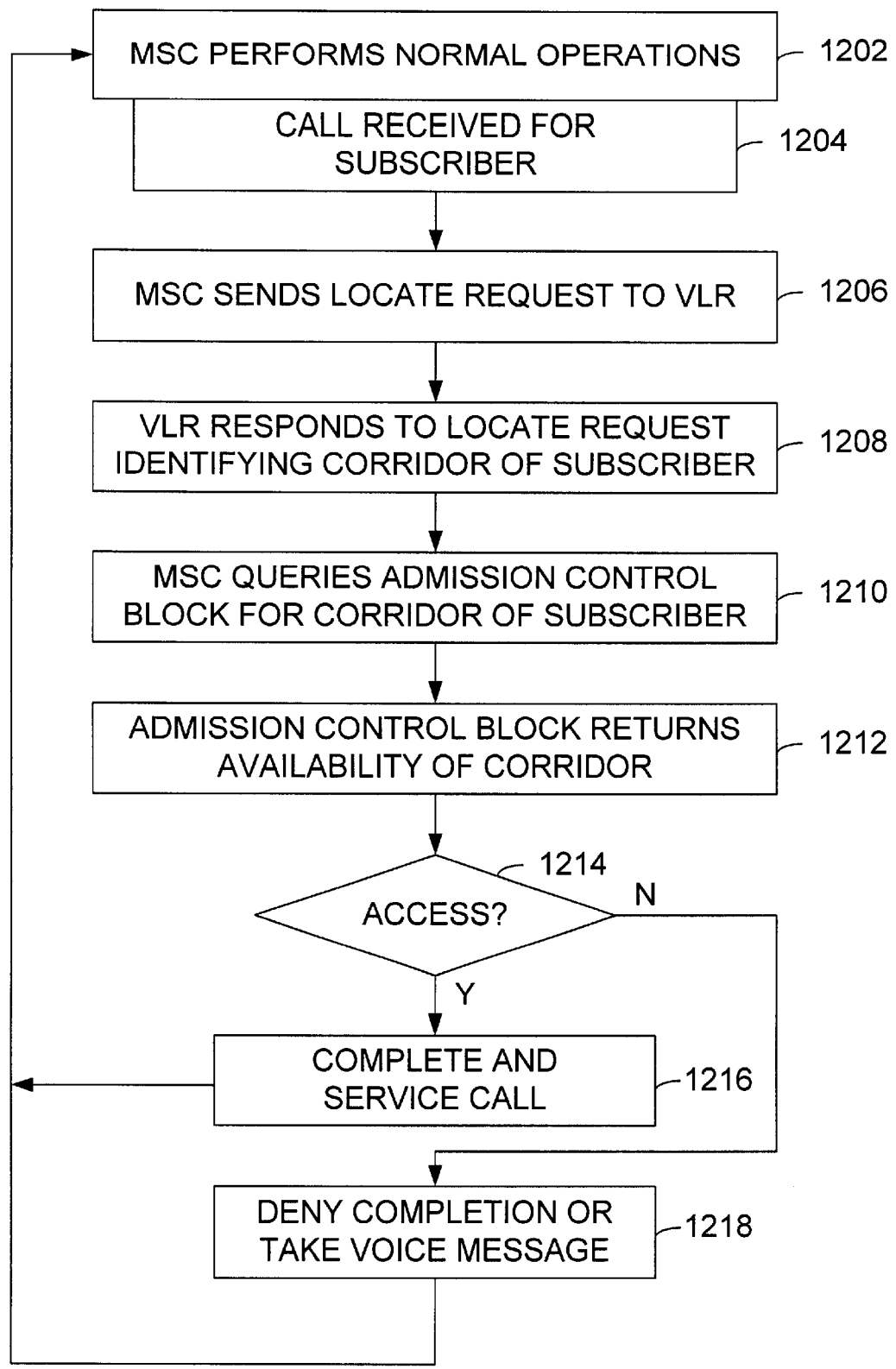
FIG. 12 is a logic diagram illustrating operation according to the present invention in selectively completing a call to a subscriber unit.

FIG. 12 is a logic diagram illustrating operation according to the present invention in selectively completing a call to a subscriber unit. Operation commences at step 1202 where the MSC performs normal operations until a call is received for a subscriber unit at step 1204. From step 1204, operation proceeds to step 1206 wherein the MSC sends a locate request to the VLR for the subscriber unit. The VLR responds at step 1208, identifying the corridor in which the subscriber was last located. Based upon the identity of the corridor, the MSC queries the ACB for the corridor in which the subscriber appears to be located at step 1210. The ACB returns the corridor availability information to the MSC at step 1212, indicating the class supported by the corridor.

At step 1214, it is determined whether the corridor supports delivery of the call. For example, if the corridor is loaded, it may support delivery of only premium subscriber calls. If the corridor does support delivery for the class of the destination subscriber, the call is completed and serviced at step 1216. However, if the corridor does not support delivery to the subscriber, completion is denied and/or a voice message is taken at step 1218. From both steps 1216 and 1218, operation returns to step 1202.

For calls originating from a subscriber unit, at least two differing scenarios may be employed. Where the subscriber unit has knowledge of whether it has access to the system, it will apprise the user of such potential limitations or prevent access. In the case of a low priority voice user, or a low priority data user (e.g., a vending machine), the origination of calls will be controlled by the subscriber unit to preclude call initiation when the subscriber unit does not have access. Where the subscriber unit does not know whether it has access to the system, the network infrastructure may simply block its attempted call if the subscriber unit does not have access to the system (as may be determined upon access of an ACB). Thus, in either case, the subscriber unit will not be able to originate a call if it does not have access to the system.

In a variation of this scheme, the user may override his or her access limitations in certain situations. For example, if a low priority voice user of a particular subscriber class does not have access at the present time due to current subscriber loading, he or she may select to pay an additional fee to access the system. In another example, a user may have a particular number of high demand minutes included in his or her plan which may be used in such a situation. In still another example, a data user, such as an electronic billboard may override accessibility limitations to perform updates, with such access incurring an additional charge.

Figure 13:
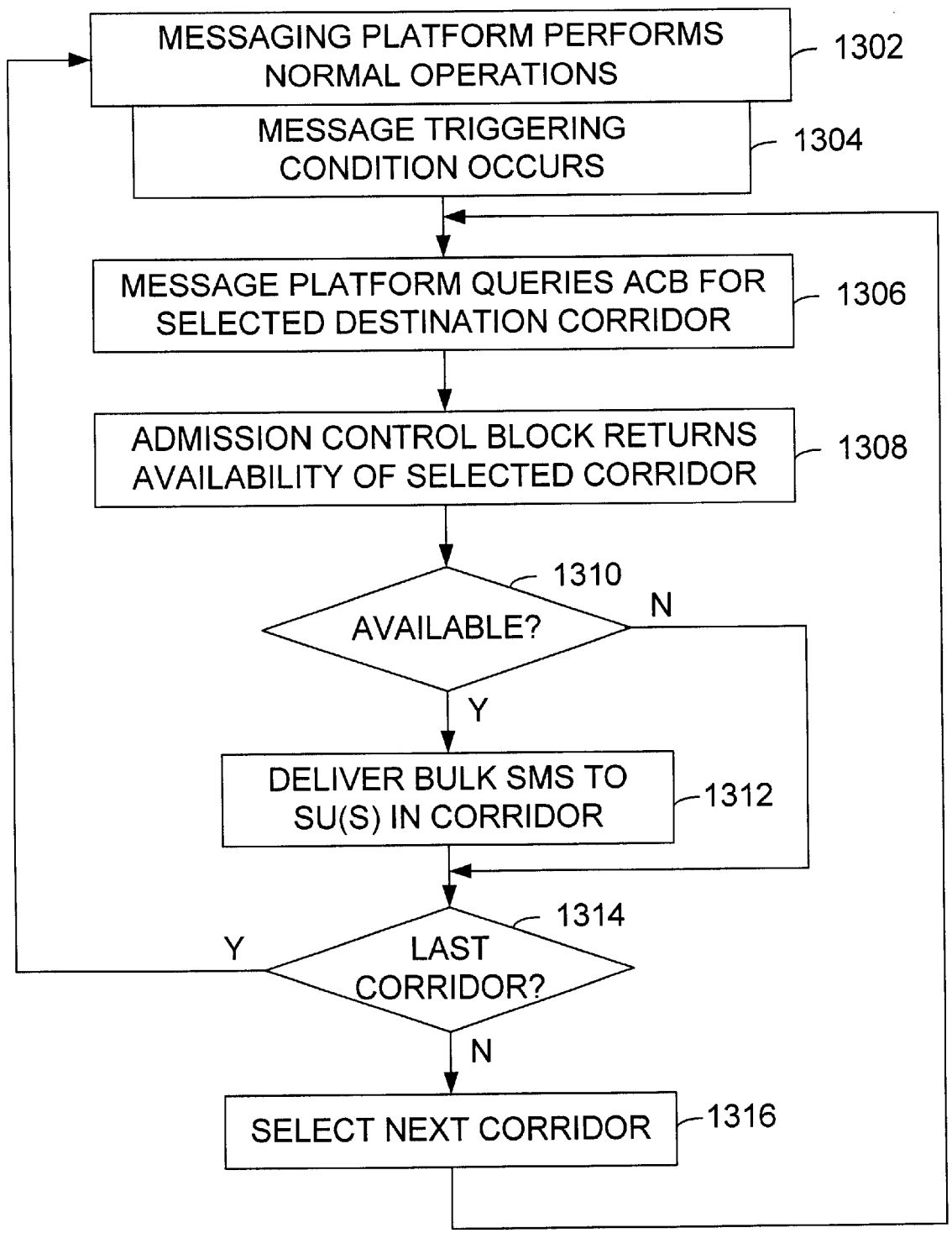
FIG. 13 is a logic diagram illustrating operation according to the present invention in delivering short messages to a plurality of subscriber units in a plurality of corridors.

FIG. 13 is a logic diagram illustrating operation according to the present invention in delivering short messages to a plurality of subscriber units in a plurality of corridors. Operation commences at step 1302 wherein a messaging platform performs normal operations until a message triggering condition occurs at step 1304. Such a message triggering condition may be the expiration of a clock, receipt of new information to be disseminated or such other event that would initiate sending a message to a plurality of subscribers.

The messaging platform, in its operation, must deliver messages to a plurality of corridors. Thus, From step 1304, operation proceeds to step 1306 where the messaging platform queries the ACB (which may be present on a SCP) for a selected destination corridor. At step 1308, the ACB returns the availability of the selected corridor for the delivery of the message. If the corridor is available, as determined at step 1310, the message is delivered to the subscribing units operating in the corridor at step 1312. After sending the message at step 1312, and from step 1310 if the corridor is not available, operation proceeds to step 1314. At step 1314, it is determined whether the previously considered corridor was the last corridor to be considered. If so, operation proceeds to step 1302. If not, a next corridor is selected at step 1316 and operation proceeds to step 1306 wherein operations are repeated for the next corridor.

Figure 14:
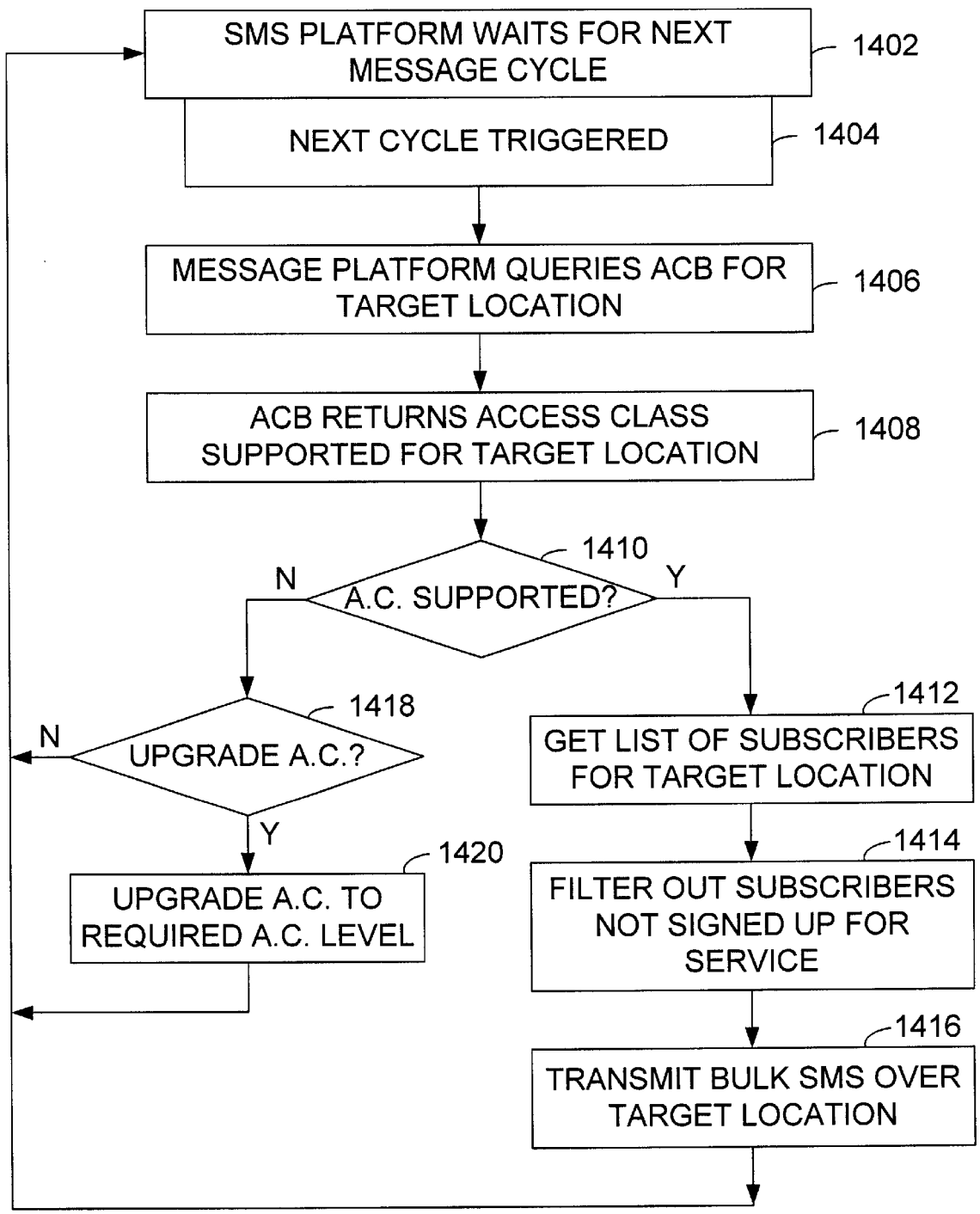
FIG. 14 is a logic diagram illustrating operation according to the present invention in delivering time sensitive and time insensitive messages.

FIG. 14 is a logic diagram illustrating operation according to the present invention in delivering time sensitive and time insensitive messages. Such messages may be for receipt by a human user. However, these messages may also be for receipt by a machine, without human intervention. As was previously described, some messages are time sensitive while other messages are not. Operation will depend in some cases upon the time sensitivity of the message delivery.

Operation commences at step 1402 where a messaging platform waits for a next message cycle to be triggered. When the next message cycle is triggered at step 1404, operation commences to step 1406 where the message platform queries the ACB (which may be present on a SCP) for target location information. At step 1408 the ACB returns ACB information for the supported target location. Then, at step 1410, it is determined whether the access class is supported for the target location at the present time. If the access class is supported, operation proceeds to step 1412 where a list of subscribers for the target location is retrieved. Then, at step 1414, subscribers not signed up for service in the target location are filtered out. Then, the bulk SMS is transmitted to the subscribers over the target location.

If at 1410, it is determined that the access class is not supported, operation proceeds to step 1418 where it is determined whether the access class for the target subscribers should be altered so that the message may be sent. While some messages are time insensitive and may be sent as system conditions permit, other messages are time sensitive and must be sent within a particular time window. An example of such a time sensitive message is one that notifies subscribers of a limited time offer, such as a happy hour in a venue adjacent the corridor in which the subscribers currently reside. Thus, for time sensitive messages whose transmission has been delayed, the SYM system may determine that messages must be sent in the near future. If so, operation proceeds to step 1420 where the access class for the message is upgraded to a required access class level. From step 1420, and if the access class is not to be upgraded from step 1418, operation proceeds to step 1402.

Based on time criticality, the location based and subscriber-list based bulk services described are either sensitive to latency (stock quotes) or need to be delivered in a pre-determined time window (e.g., a Happy Hour ad). These messaging services could be offered at multiple access-class levels. Thus if a messaging application needs to send messages during a time window and is unable to send it due to the current access class supported at a particular location, it could elevate the access-class on a individual message-set basis and hence guarantee delivery of that bulk message in the time window (as described at step 1420).

A messaging platform may service certain message types according to the methodology of FIG. 14. A first service is driven by fixed ACB updates and is supported at a certain access-class level. When that access-class is supported, the data gathering platform uses one channel to make sequential accesses to multiple devices over that corridor/cell-sector and transfers data to the messaging platform. The messaging platform then formulates and tabulates the data collected, and the results may be provided to a single wireless device or to an external computer. The second service is driven by a burst of code transmitted over the broadcast channel across the target area. The subscriber unit or fixed device is programmed to respond to the burst of code to either transmit at full rate, half rate, or, not transmit at all.

In a GSM implementation, for the SYM system enabled voice services (e.g. load based two-tiered plans), the network may need to narrowcast tariff information to a subset of handsets in a given location area. Technologies that may be utilized in providing such information are the Subscriber Identity Module (SIM) application toolkit and the SMS-Broadcast function. Because the small chip on the SIM actually contains a microcontroller, the SIM can be called on to do much more than simply exchange data between the SIM's memory and the mobile equipment. The SIM application toolkit exploits the SIM's full potential. The toolkit allows SIM to do various things like initiate a dialogue with the user, play a tone in the ear-piece and allow the wireless network to communicate with the SIM without user knowledge.

The SIM system can issue commands and download information to one or many SIMS is a corridor via SMS-Point to Point (SMS-PP) or SMS-Cell Broadcast (SMS-CB) messages. The user is not aware that the subscriber unit just received a command or information. With SMS-PP messages, a command or information can be sent to an individual subscriber unit via a dedicated envelope command. The protocol allows for conformation of delivery of the command without user knowledge. SMS CB messages come with a certain cell broadcast message identifier (CBMID) that is stored in the SIM tells the subscriber unit to pass the message to SIM without displaying it. The SIM application toolkit can be programmed to display a certain tarriff information (e.g., CBMID of 21=Premium Rate and CBMID of 22=Discount Rate) on the handset. When the System operator wants to encourage subscribers of this class to make calls, in a certain corridor, they can transmit a CBMID of 22.

Figure 15:
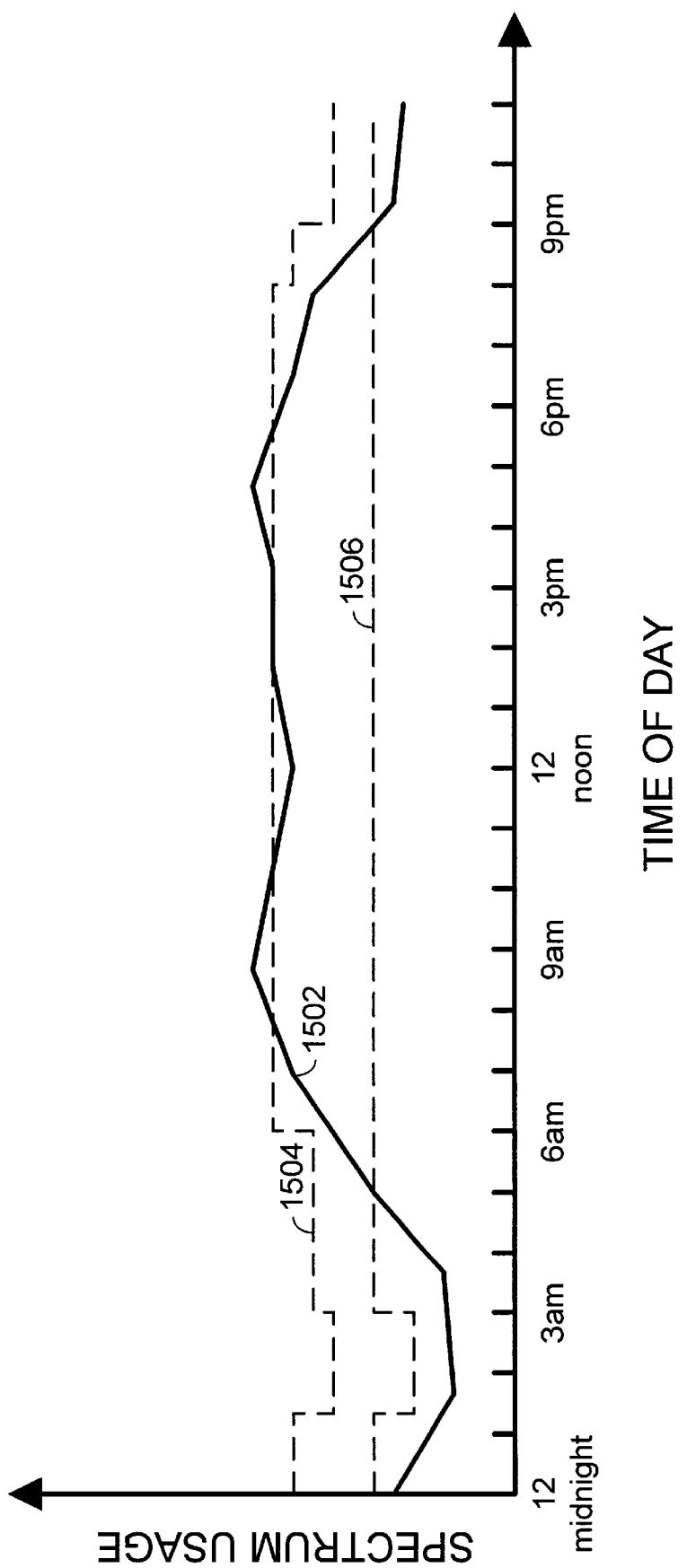
FIG. 15 is a diagram illustrating load serviced by a base station throughout a twenty-four hour period and its relationship to BTS watermarks.

FIG. 15 is a diagram illustrating load serviced by a base station throughout a twenty-four hour period and its relationship to BTS watermarks. Curve 1502 represents actual loading serviced by a particular base station within a wireless communication system serviced by a SYM system constructed according to the present invention. Curve 1504 represents a high BTS watermark profile for the base station. Further curve 1506 represents a low BTS watermark profile for the base station. As is shown, the BTS watermark profiles vary slightly over the day, roughly corresponding to the variation in load of the base station.

As is shown, the load 1502 is below the low BTS watermark from 12 midnight to approximately 5 a.m. and after approximately 9 p.m. During these loading periods, additional usage of the base station is encouraged. Such encouragement may be in the form of a service incentive signal being sent to registered subscribers within the cell. Additional encouragement may be in the form of a service incentive signal that allows premium voice users to make calls at no cost during these time periods. Further, during these time periods, all classes of users are given access to the system to perform all required operations. During these reduced loading periods, machine based communications are also encouraged (by allowing access to all messaging classes).

Between approximately 7:30 a.m. and 6 p.m., loading on the cell is at or near the upper BTS watermark. When the loading exceeds the upper BTS watermark, two things can occur. Firstly, the base station may send a real-time loading update to the SYM system. Secondly, access to the base station may be reduced by altering an ACB for the base station. In such case, one or more classes may be precluded from initiating calls from/to the base station. Further, spectrum may be reserved for one or more class as well.

Figure 16:
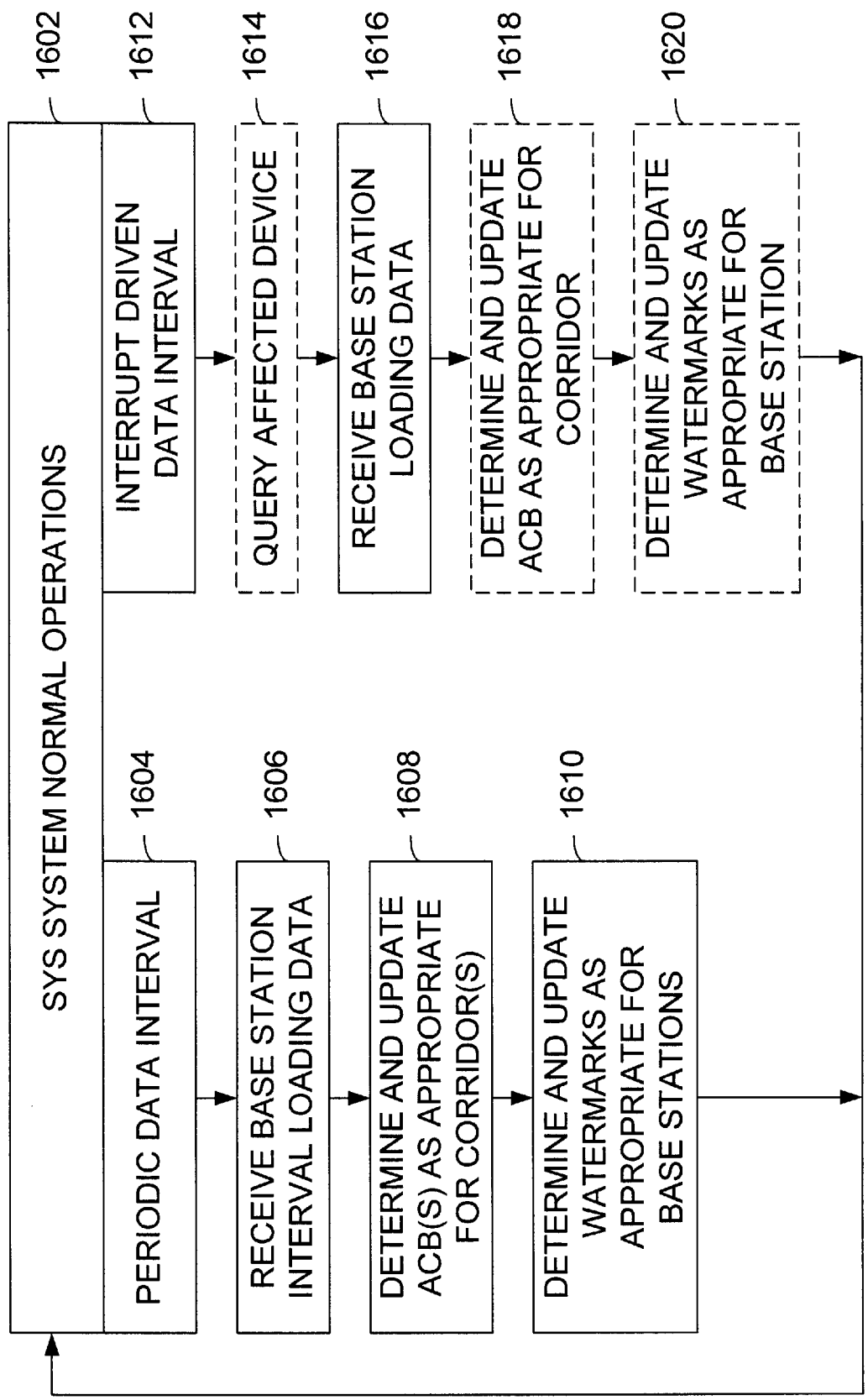
FIG. 16 is a logic diagram illustrating operation according to the present invention in receiving loading information.

FIG. 16 is a logic diagram illustrating operation according to the present invention in receiving loading information. At step 1602, the SYM system performs its normal operations. At step 1604, a periodic interval is met. From step 1604, operation proceeds to step 1606 wherein the SYM system receives base station interval loading data from the base stations managed by the SYM system. Then, at step 1608, the SYM system determines which ACBs should be updated and updates the corresponding ACBs. Then, at step 1610, the SYM system determines which BTS watermarks, if any, should be updated and downloads the new BTS watermarks to the affected base stations.

At step 1612, an interrupt driven data interval commences. Such an interrupt driven data interval may correspond to load at a base station exceeding a respective BTS watermark. When such an event occurs, the SYM system optionally queries the affected device at step 1614. If the base station automatically uploads data upon the interrupt driven data interval, such query is not required. Then, at step 1616, the SYM system receives the loading data from the base station. If required, the SYM system then determines and updates ACB(s) as is appropriate for the corresponding corridor at step 1618. At step 1620, if required, the SYM system determines and updates BTS watermarks for the affected base station(s). From both step 1610 and step 1620 operation returns to step 1602.

Figure 17:
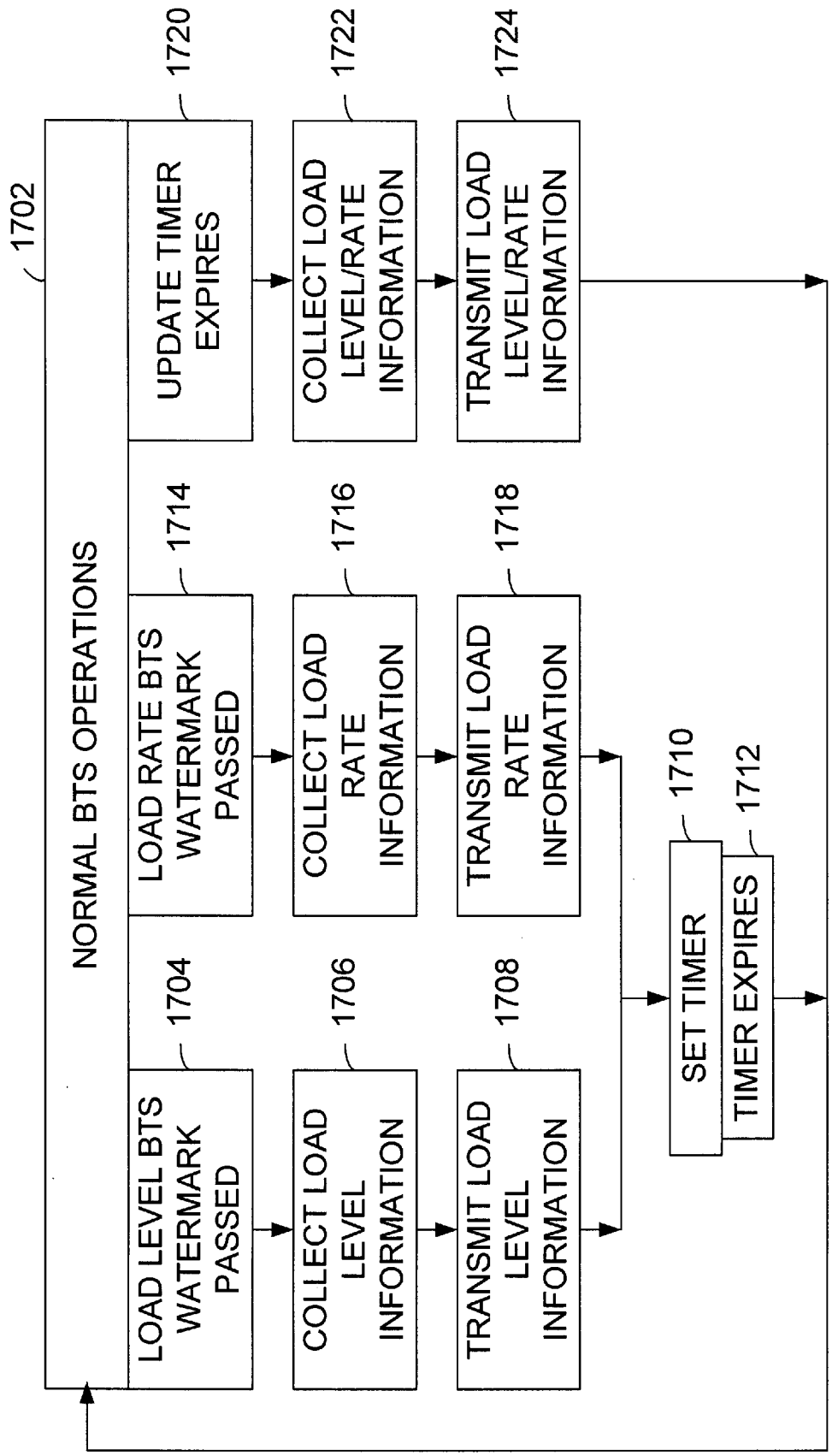
FIG. 17 is a logic diagram illustrating operation of a base station/BTS according to the present invention in recording load and transmitting the load to a spectrum yield management system.

FIG. 17 is a logic diagram illustrating operation of a base station/BTS according to the present invention in recording load and transmitting the load to a spectrum yield management system. Operation commences at step 1702 wherein the BTS performs normal operations. At step 1704, current loading compares unfavorably to a load level BTS watermark of the BTS. From step 1704, operation proceeds to step 1706 wherein the BTS collects load level information and then to step 1708 where the BTS transmits the load level information to the SYM system. From step 1710, operation proceeds to step 1710 wherein a timer is set and where operation remains until step 1712 at which point operation returns to step 1702.

At step 1714, the rate at which the BTS is loaded compares unfavorably to a load rate BTS watermark of the BTS. The comparison is unfavorable when the rate at which the BTS is loaded increases/decreases at a rate exceeding the BTS watermark. Such may be the case when an accident occurs on the highway and a large number of users initiate phone calls. From step 1716 operation proceeds to step 1716 where load rate information is collected for the BTS and to step 1718 where the load rate information is transmitted to the SYM system. From step 1718, operation proceeds to step 1710.

BTS watermarks may also be established that are based in the acceleration of loading of the BTS, in other words the rate at which the load rate is changing. In such a case, the acceleration of loading of the BTS is monitored and compared to a corresponding BTS watermark. When the comparison is unfavorable, the acceleration of loading is collected and transmitted. Based upon the unfavorable comparison, a coupled SYM system may alter accessibility to the BTS.

At step 1720, an update time expires. From step 1720, operation proceeds to step 1722 where load levels/load rates are collected and then to step 1724 where the load levels/load rates are transmitted from the BTS to the SYM system. Then, from step 1724, operation returns to step 1702.

The invention disclosed herein is susceptible to various modifications and alternative forms. Specific embodiments therefor have been shown by way of example in the drawings and detailed description. It should be understood, however, that the drawings and detailed description thereto are not intended to limit the invention to the particular form disclosed, but on the contrary, the invention is to cover all modifications, equivalents and alternatives falling within the spirit and scope of the present invention as defined by the claims.

What is claimed is:

1. In a wireless communication system that supports wireless communications throughout a service coverage area for a plurality of subscribers, a method for operating the wireless communication system comprising:

segregating the service coverage area into a plurality of corridors, wherein each of the plurality of corridors includes a plurality of cells/sectors that have similar loading patterns and that form a contiguous portion of the service coverage area;

determining subscriber load within at least some of the plurality of corridors;

determining a loading threshold within at least some of the plurality of corridors;

for a corridor in which subscriber load is determined, determining whether a respective subscriber load compares unfavorably to a respective loading threshold;

if the respective subscriber load compares unfavorably to the respective loading threshold in the corridor, altering subscriber accessibility in the corridor.

2. The method of claim 1, wherein:

the respective subscriber load compares unfavorably to the respective loading threshold when the respective subscriber load is less than the respective loading threshold; and in altering subscriber accessibility, a service incentive signal is relayed to subscribers operating in the corridor that relays an offer to complete a call at a reduced rate.

3. The method of claim 1, wherein:

the respective subscriber load compares unfavorably to the respective loading threshold when the respective subscriber load is less than the respective loading threshold; and in altering subscriber accessibility, a service incentive signal is relayed to subscribers operating in the corridor that relays an offer to complete a call without cost.

4. The method of claim 1, wherein:

the respective subscriber load compares unfavorably to the respective loading threshold when the respective subscriber load is less than the respective loading threshold; and in altering subscriber accessibility, a service incentive signal is relayed to subscribers operating in the corridor that relays an offer to continue a call at a reduced rate.

5. The method of claim 1, wherein:

the respective subscriber load compares unfavorably to the respective loading threshold when the respective subscriber load is greater than the respective loading threshold; and in altering subscriber accessibility, a service incentive signal is relayed to subscribers operating in the corridor that relays notification of an increased rate.

6. The method of claim 1, wherein:

the respective subscriber load compares unfavorably to the respective loading threshold when the respective subscriber load is greater than the respective loading threshold; and in altering subscriber accessibility, a service incentive signal is relayed to subscribers operating in the corridor that relays notification of interruption of service.

7. The method of claim 1, wherein:

the respective subscriber load compares unfavorably to the respective loading threshold when the respective subscriber load is greater than the respective loading threshold; and in altering subscriber accessibility, calls are blocked for some of the subscribers operating in the corridor.

8. The method of claim 1, wherein the subscriber load within the plurality of corridors is determined based upon actual loading within the corridor.

9. The method of claim 1, wherein the subscriber load within a corridor is determined based upon potential loading within the corridor.

10. The method of claim 1, wherein:

subscriber load is determined within a first corridor of the plurality of corridors based upon actual loading within the first corridor; and subscriber load is determined within a second corridor based upon the actual loading in the first corridor.

11. The method of claim 1, wherein the respective loading thresholds vary over time.

12. The method of claim 1, wherein:

the wireless service provided within the service coverage area is provided to a plurality of classes, where each subscriber is a member of at least one class of the plurality of classes; and in altering subscriber accessibility, subscribers of some classes are given greater accessibility to the corridor than are subscribers of other classes.

13. The method of claim 12, wherein in altering accessibility:

a first type of service option signal relays a first service incentive to subscribers of a first class; and a second type of service option signal relays a second service incentive to subscribers of a second class.

14. The method of claim 13, wherein:

the first service option signal relays an offer to complete a call at a reduced rate; and the second service option signal relays an offer to complete a call without cost.

15. The method of claim 12, wherein in altering accessibility, subscribers of some classes are allocated a greater spectrum bandwidth than are subscribers of other classes in the corridor.

16. The method of claim 15, wherein in altering accessibility, subscribers of a voice class are allocated a greater spectrum bandwidth than are subscribers of a data class in the corridor.

17. In a wireless communication system that supports wireless communications throughout a service coverage area for a plurality of subscribers, a method for operating the wireless communication system comprising:

segregating the service coverage area into a plurality of corridors, wherein each of the plurality of corridors includes a plurality of cells/sectors that have similar loading patterns and that form a contiguous portion of the service coverage area;

determining subscriber load within at least some of the plurality of corridors;

determining a loading threshold within at least some of the plurality of corridors;

for a corridor in which subscriber load is determined, determining whether a respective subscriber load compares unfavorably to a respective loading threshold;

if the respective subscriber load compares favorable to the respective loading threshold, delivering at least one short message to subscriber units operating within the corridor.

18. The method of claim 17, wherein:

the respective subscriber load compares unfavorably to the respective loading threshold when the respective subscriber load is greater than the respective loading threshold; and the at least one short message is delivered to the subscriber units at a later time.

19. The method of claim 17, further comprising:

attempting delivery of the at least one short message for a period of time; and after the period of time expires, adjusting the loading threshold so that the at least one short message may be delivered to the subscriber units.

20. The method of claim 17, wherein the subscriber load within the plurality of corridors is determined based upon actual loading within the corridor.

21. The method of claim 17, wherein the subscriber load within the plurality of corridors is determined based upon potential loading within the corridor.

22. The method of claim 17, wherein the subscriber load within the plurality of corridors is determined based upon historical loading within the corridor.

23. In a wireless communication system that supports wireless communications throughout a service coverage area for a plurality of subscribers, a method for operating the wireless communication system comprising:

segregating the plurality of subscribers into a plurality of classes;

segregating the service coverage area into a plurality of corridors, wherein each of the plurality of corridors includes a plurality of cells/sectors that have similar loading patterns and that form a contiguous portion of the service coverage area;

determining subscriber load for a corridor of the plurality of corridors;

determining a loading threshold for the corridor;

when the subscriber load compares unfavorably to the loading threshold in the corridor, altering subscriber accessibility to the wireless communication system in the corridor for subscribers of a class of the plurality of classes.

24. The method of claim 23, wherein altering subscriber accessibility to the wireless communication system in the corridor includes reserving capacity for subscribers of the class.

25. The method of claim 23, wherein altering subscriber accessibility to the wireless communication system in the corridor includes:

queuing a subscriber call for a subscriber of the class when the call cannot be serviced due to the subscriber load; and when servicing of the call is allowed, completing the call for the subscriber of the class.

26. The method of claim 23, wherein altering subscriber accessibility to the wireless communication system in the corridor includes preventing subscribers of other classes from accessing the wireless communication system.

27. The method of claim 23, further comprising:

determining subscriber load within each of the plurality of corridors;

determining a loading threshold for the each of the plurality of corridors;

for each of the plurality of corridors, determining whether a respective subscriber load compares unfavorably to a respective loading threshold; and when the subscriber load compares unfavorably to the respective loading threshold in a of the plurality of corridors, altering subscriber accessibility for subscribers of a class of the plurality of classes within the corridor.

28. The method of claim 27, wherein altering subscriber accessibility for subscribers of the class within the corridor includes preventing subscribers of other classes from accessing the wireless communication system within the corridor.

29. The method of claim 27, wherein altering subscriber accessibility for subscribers of the class includes:

queuing a subscriber call for a subscriber of the class when the call cannot be serviced due to the subscriber load; and when servicing of the call is allowed within the corridor, completing the call for the subscriber of the class.

30. The method of claim 23, wherein, in altering subscriber accessibility within the corridor, subscribers of the class receive service option signals.

31. The method of claim 23, wherein:

the subscriber load compares unfavorably to the loading threshold when the subscriber load is less than the loading threshold; and in altering subscriber accessibility in the corridor, a service incentive signal is relayed to subscribers of at least one class that relays an offer to complete a call at a reduced rate.

32. The method of claim 23, wherein:

the subscriber load compares unfavorably to the loading threshold when the subscriber load is less than the loading threshold; and in altering subscriber accessibility in the corridor, a service incentive signal is relayed to subscribers of at least one class that relays an offer to complete a call without cost.

33. The method of claim 23, wherein:

the subscriber load compares unfavorably to the loading threshold when the subscriber load is less than the loading threshold; and in altering subscriber accessibility in the corridor, a service incentive signal is relayed to subscribers of at least one class that relays an offer to continue a call at a reduced rate.

34. The method of claim 23, wherein:

the subscriber load compares unfavorably to the loading threshold when the subscriber load is greater than the loading threshold; and in altering subscriber accessibility in the corridor, a service incentive signal is relayed to subscribers of at least one class that relays notification of an increased rate.

35. The method of claim 23, wherein:

the subscriber load compares unfavorably to the loading threshold when the subscriber load is greater than the loading threshold; and in altering subscriber accessibility in the corridor, a service incentive signal is relayed to subscribers of at least one class that relays notification of interruption of service.

36. The method of claim 23, wherein:

the respective subscriber load compares unfavorably to the loading threshold when the subscriber load is greater than the loading threshold; and in altering subscriber accessibility in the corridor, calls are blocked for at least one class.

37. The method of claim 23, wherein the subscriber load is determined based upon actual loading within the corridor.

38. The method of claim 23, wherein the subscriber load is determined based upon potential loading within the corridor.

39. The method of claim 23, wherein the loading threshold varies over time.

40. A spectrum yield management system for use in conjunction with a wireless communication system that supports wireless communications throughout a service coverage area for a plurality of subscribers, the spectrum management yield system comprising:

a data receiving interface that receives subscriber load information for at least some of a plurality of corridors defined within the service coverage areas, wherein each of the plurality of corridors includes a plurality of cells/sectors that have similar loading patterns and that form a contiguous portion of the service coverage area;

a system operator interface that receives operating goals for the plurality of corridors;

a computing device that couples to the data receiving interface and the system operator interface, that determines loading thresholds within at least some of the plurality of corridors based upon the operating goals, and that determines whether a respective subscriber load compares unfavorably to a respective loading threshold; and an output interface coupled to the computing device that, if the respective subscriber load compares unfavorably to the respective loading threshold in the corridor, causes subscriber accessibility in the corridor to be altered.

41. The spectrum yield management system of claim 40, wherein:

the computing device determines that the respective subscriber load compares unfavorably to the respective loading threshold when the respective subscriber load is less than the respective loading threshold; and in altering subscriber accessibility, the output interface relays a service incentive signal to subscribers operating in the corridor that relays an offer to complete a call at a reduced rate.

42. The spectrum yield management system of claim 40, wherein:

the computing device determines that the respective subscriber load compares unfavorably to the respective loading threshold when the respective subscriber load is less than the respective loading threshold; and in altering subscriber accessibility, the output interface relays a service incentive signal to subscribers operating in the corridor that relays an offer to complete a call without cost.

43. The spectrum yield management system of claim 40, wherein:

the computing device determines that the respective subscriber load compares unfavorably to the respective loading threshold when the respective subscriber load is less than the respective loading threshold; and in altering subscriber accessibility, the output interface relays a service incentive signal to subscribers operating in the corridor that relays an offer to continue a call at a reduced rate.

44. The spectrum yield management system of claim 40, wherein:

the computing device determines that the respective subscriber load compares unfavorably to the respective loading threshold when the respective subscriber load is greater than the respective loading threshold; and in altering subscriber accessibility, the output interface relays a service incentive signal to subscribers operating in the corridor that relays notification of an increased rate.

45. The spectrum yield management system of claim 40, wherein:

the computing device determines that the respective subscriber load compares unfavorably to the respective loading threshold when the respective subscriber load is greater than the respective loading threshold; and in altering subscriber accessibility, the output interface relays a service incentive signal to subscribers operating in the corridor that relays notification of interruption of service.

46. The spectrum yield management system of claim 40, wherein:

the computing device determines that the respective subscriber load compares unfavorably to the respective loading threshold when the respective subscriber load is greater than the respective loading threshold; and in altering subscriber accessibility, the output interface causes calls to be blocked for some of the subscribers operating in the corridor.

47. The spectrum yield management system of claim 40, wherein the subscriber load within the plurality of corridors is determined based upon actual loading within the corridor.

48. The spectrum yield management system of claim 40, further comprising a plurality of access control blocks, each of which indicates accessibility within a respective corridor of the plurality of corridors.

49. The spectrum yield management system of claim 40, wherein:

the computing device determines the subscriber load within a first corridor of the plurality of corridors based upon actual loading within the first corridor; and the computing device determines the subscriber load within a second corridor based upon the actual loading in the first corridor.

50. The spectrum yield management system of claim 40, wherein the respective loading thresholds vary over time.

51. The spectrum yield management system of claim 40, wherein:

the wireless service provided within the service coverage area is provided to a plurality of classes, where each subscriber is a member of at least one class of the plurality of classes; and in altering subscriber accessibility, subscribers of some classes are given greater accessibility to the corridor than are subscribers of other classes.

52. The spectrum yield management system of claim 51, wherein in altering accessibility:

a first type of service option signal provided by the output interface relays a first service incentive to subscribers of a first class; and a second type of service option signal provided by the output interface relays a second service incentive to subscribers of a second class.

53. The spectrum yield management system of claim 51, wherein:

the first service option signal provided by the output interface relays an offer to complete a call at a reduced rate; and the second service option signal provided by the output interface relays an offer to complete a call without cost.

54. The spectrum yield management system of claim 51, wherein in altering accessibility, subscribers of some classes are allocated a greater spectrum bandwidth than are subscribers of other classes in the corridor.

55. The spectrum yield management system of claim 54, wherein in altering accessibility, subscribers of a voice class are allocated a greater spectrum bandwidth than are subscribers of a data class in the corridor.

56. The spectrum yield management system of claim 40, wherein:

the respective subscriber load compares unfavorably to the respective loading threshold when the respective subscriber load is less than the respective loading threshold; and in altering subscriber accessibility, the output interface relays a service incentive signal to a message service which delivers at least one short message to subscriber units operating within the corridor.

57. A spectrum yield management system for use in conjunction with a wireless communication system that supports wireless communications throughout a service coverage area for a plurality of subscribers, the spectrum management yield system comprising:

a data receiving interface that receives subscriber load information;

a system operator interface that receives operating goals for a plurality of classes operating in the wireless communication system, where each of the plurality of subscribers is a member of at least one of the plurality of classes;

a computing device that couples to the data receiving interface and the system operator interface, that determines a loading threshold based upon the operating goals, and that determines whether the subscriber load compares unfavorably to the loading threshold; and an output interface coupled to the computing device that, if the respective subscriber load compares unfavorably to the respective loading threshold, causes subscriber accessibility to be altered for a class.

58. The spectrum yield management system of claim 57, wherein altering subscriber accessibility to the wireless communication system includes reserving capacity for the class.

59. The spectrum yield management system of claim 57, wherein altering subscriber accessibility to the wireless communication system includes:

queuing a subscriber call for a subscriber of the class when the call cannot be serviced due to the subscriber load; and when servicing of the call is allowed, completing the call for the subscriber of the class.

60. The spectrum yield management system of claim 57, wherein altering subscriber accessibility to the wireless communication system includes preventing subscribers of other classes from accessing the wireless communication system.

61. The spectrum yield management system of claim 57, wherein, in altering subscriber accessibility within the corridor, subscribers of the class receive service option signals.

62. The spectrum yield management system of claim 61, wherein:

the computing device determines that the subscriber load compares unfavorably to the loading threshold when the subscriber load is less than the loading threshold; and in altering subscriber accessibility, the output interface relays a service incentive signal to subscribers of the class that relays an offer to complete a call at a reduced rate.

63. The spectrum yield management system of claim 61, wherein:

the computing device determines that the subscriber load compares unfavorably to the loading threshold when the subscriber load is less than the loading threshold; and in altering subscriber accessibility, the output interface relays a service incentive signal to subscribers of the class that relays an offer to complete a call without cost.

64. The spectrum yield management system of claim 61, wherein:

the computing device determines that the subscriber load compares unfavorably to the loading threshold when the subscriber load is less than the loading threshold; and in altering subscriber accessibility, the output interface relays a service incentive signal to subscribers of the class that relays an offer to continue a call at a reduced rate.

65. The spectrum yield management system of claim 61, wherein:

the computing device determines that the subscriber load compares unfavorably to the loading threshold when the subscriber load is greater than the loading threshold; and in altering subscriber accessibility, the output interface relays a service incentive signal to subscribers of the class that relays notification of an increased rate.

66. The spectrum yield management system of claim 57, wherein the subscriber load is determined based upon actual loading.

67. The spectrum yield management system of claim 57, wherein the subscriber load is determined based upon potential loading.

68. The spectrum yield management system of claim 57, wherein the loading threshold varies over time.

* * * * *